(12) United States Patent
Croome et al.

(10) Patent No.: US 7,773,972 B2
(45) Date of Patent: Aug. 10, 2010

(54) FUNCTIONALITY AND POLICIES BASED ON WIRELESS DEVICE DYNAMIC ASSOCIATIONS

(75) Inventors: Martin Croome, Brie et Angonnes (FR); Kevin J. Mills, Palo Alto, CA (US)

(73) Assignee: Socket Mobile, Inc., Newark, CA (US)

( * ) Notice: Subject to any disclaimer, the term of this patent is extended or adjusted under 35 U.S.C. 154(b) by 1151 days.

(21) Appl. No.: 10/438,256

(22) Filed: May 14, 2003

(65) Prior Publication Data

US 2004/0014423 A1 Jan. 22, 2004

Related U.S. Application Data

(60) Provisional application No. 60/380,730, filed on May 15, 2002.

(51) Int. Cl.
*H04M 1/66* (2006.01)
*H04M 1/68* (2006.01)
*H04M 3/16* (2006.01)
*H04M 3/00* (2006.01)
*H04B 5/00* (2006.01)
*H04K 1/00* (2006.01)
*H04L 9/08* (2006.01)
*H04L 9/32* (2006.01)

(52) U.S. Cl. .................. 455/411; 455/419; 455/420; 455/41.2; 380/270; 380/274; 380/283; 713/168; 713/169; 713/171

(58) Field of Classification Search .............. 455/410, 455/411, 419, 420, 41.2, 552.1; 380/270, 380/274, 283; 713/168, 169, 171
See application file for complete search history.

(56) References Cited

U.S. PATENT DOCUMENTS

| | | | |
|---|---|---|---|
| 6,216,014 B1* | 4/2001 | Proust et al. | 455/558 |
| 7,317,900 B1* | 1/2008 | Linde et al. | 455/74.1 |
| 2003/0189908 A1* | 10/2003 | Kuan et al. | 370/328 |
| 2004/0203362 A1* | 10/2004 | Pattabiraman et al. | 455/41.2 |
| 2006/0143466 A1* | 6/2006 | Muller et al. | 713/182 |

\* cited by examiner

*Primary Examiner*—Un C Cho
(74) *Attorney, Agent, or Firm*—PatentVentures: Bennett Smith; Korbin Van Dyke

(57) ABSTRACT

Individual wireless devices communicate amongst each other exchanging identity information, authentication-state or both, thereby forming a collaborative-collection of wireless devices. This collaborative-collection of wireless devices offers improvements over individual wireless devices in three areas. First, device functions are affected by the group of devices that are active-members of the collaborative-collection, enabling improved functionality. Second, the times-of-membership and times-of-non-membership of the devices in the collaborative-collection are monitored and this information is used to affect the function of individual devices in the collaborative-collection, including improved security and authorization policies. Third, the authentication-state of the active-member devices in the collaborative-collection affects the function of the active-member devices in the collaborative-collection, also adding to improved security.

45 Claims, 20 Drawing Sheets

| Symbol | Description |
|---|---|
| 210 | Subscriber Identity Module Not Present |
| 211 | Subscriber Identity Module Present |
| 212 | Not Authenticated by Remote SIM-based Authentication Server |
| 213 | Authenticated by Remote SIM-based Authentication Server |

| Symbol | Description |
|---|---|
| 200 | Inactive-member of collaborative-collection |
| 201 | Active-member of collaborative-collection |
| 202 | No-privilege, awaiting authentication to allow full-privilege |
| 203 | Full-privilege |
| 204 | Authentication-state container internal authentication-state A |
| 205 | Authentication-state container internal authentication-state A and authentication-state X from another active-member device in a collaborative-collection |
| $F_A$  206 | Function  A |
| $F_{A*}$  207 | Modified function  A |
| $(F_A)$  208 | New function  A |
| $(F_A)$  209 | Deleted function  A |

Fig. 2

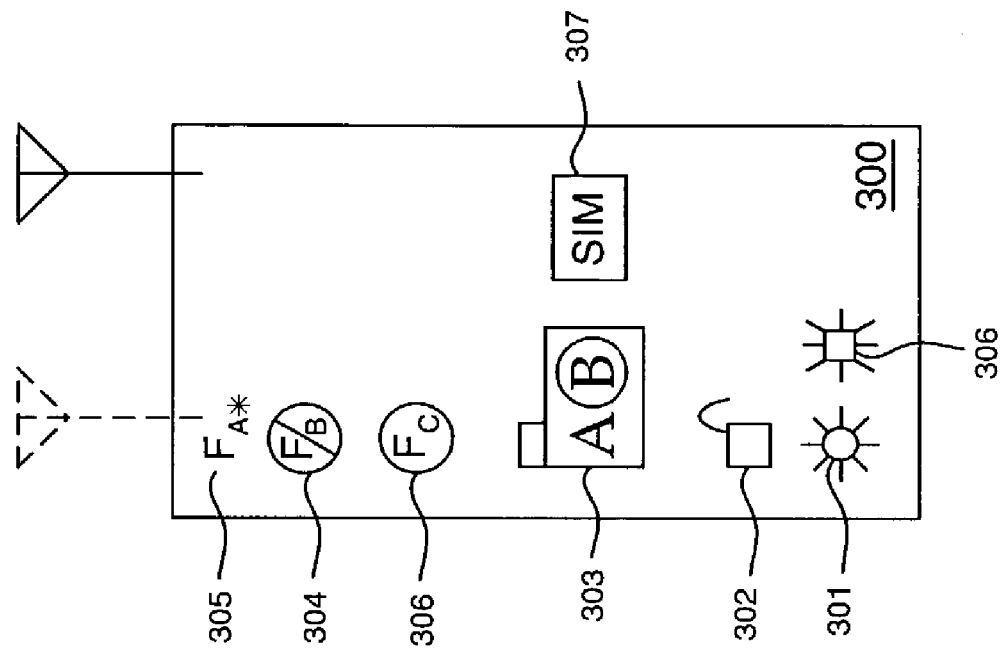
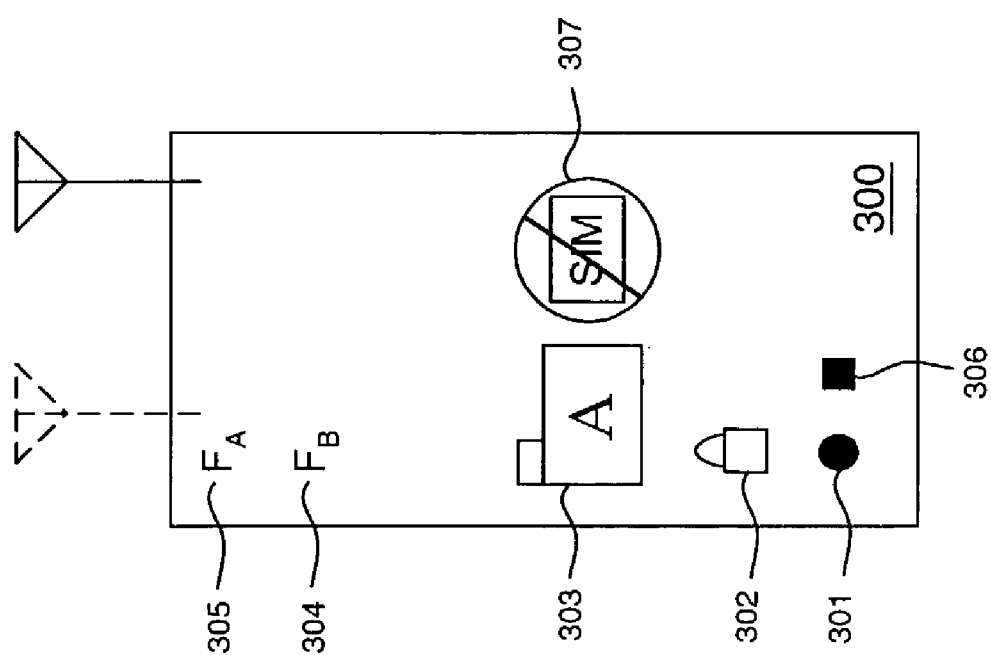

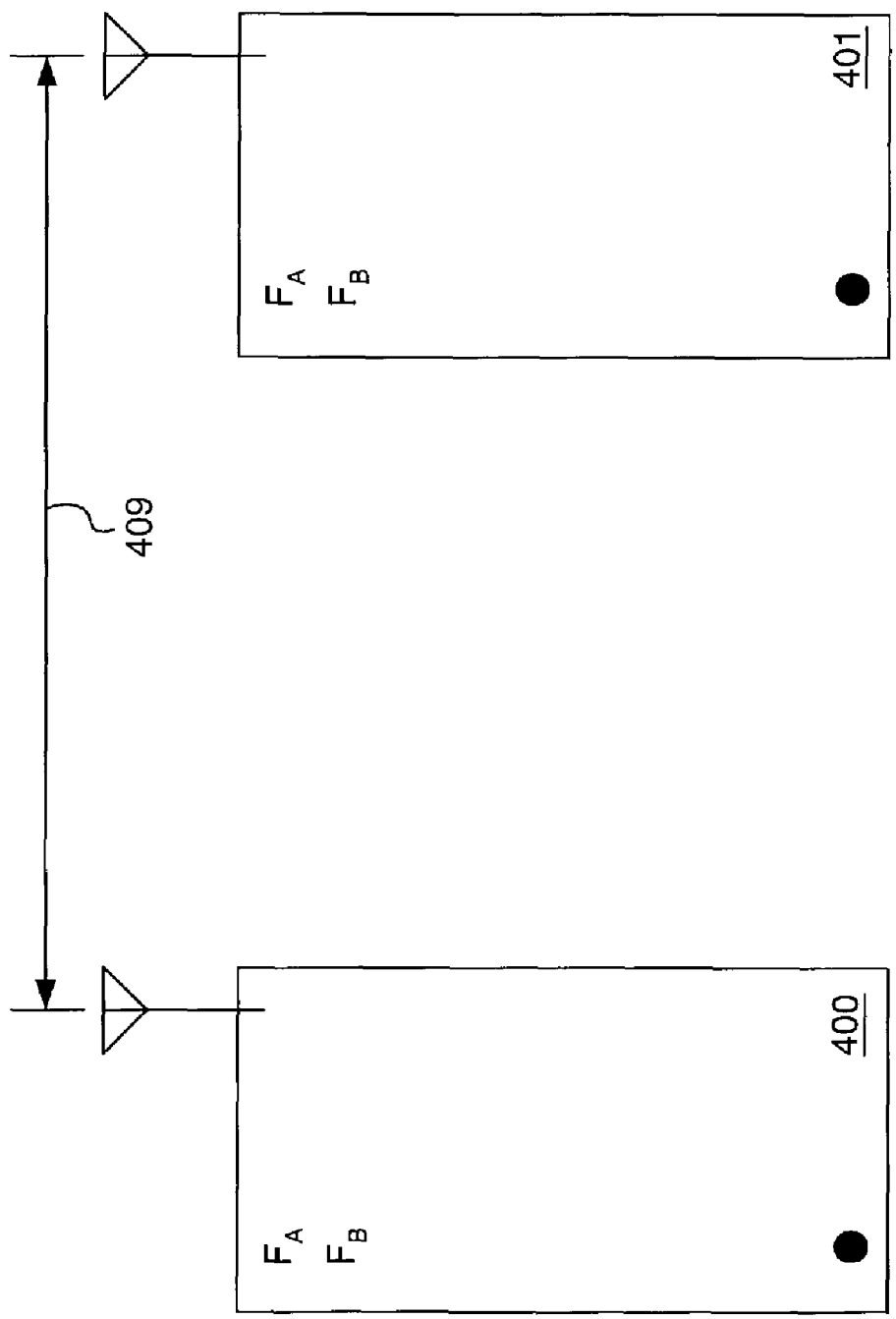

FUNCTIONALITY AND POLICIES BASED ON WIRELESS DEVICE DYNAMIC ASSOCIATIONS

BACKGROUND

A variety of wireless access networks are currently in use, each having different characteristics and primary applications. One way to organize these wireless access networks is by their (typical maximum inter-node) range capabilities. Wireless Global Area Networks (WGAN) have a range of 500-1500 km (user to satellite). An example WGAN is the Iridium GlobalStar system. Wireless Metropolitan Area Networks (WMAN) have a range of 30 km. An example WMAN is the Sprint fixed wireless service. Wireless Wide Area Networks (WWAN) have a range of 2-3 km. WWANs include TDMA-derivative or CDMA-derivative networks based on any of the existing or proposed 2G, 2.5G, and 3G (second, enhanced-second, and third generation) mobile voice and data systems. Wireless Local Area Networks (WLAN) have a range of 100 m. An example WLAN is the IEEE 802.11b system, discussed below. Wireless Personal Area Networks (WPAN) have a range of 10 m. An example WPAN is the Bluetooth System, discussed below. Other example WPAN systems are the IrDA system, backed by the Infrared Data Association, and the Shared Wireless Access Protocol (SWAP), backed by the HomeRF working group. It will be recognized that the above distances are merely suggestive of how a particular wireless access network might be categorized and categorizing a given wireless access networks as belonging to one category or another can be subjective and arbitrary.

The Bluetooth System is described in "Specification of the Bluetooth System, Volumes 1 and 2, Version 1.1, Feb. 22, 2001", from the Bluetooth SIG. The term Bluetooth will be used to refer to wireless access mechanisms compliant with the aforementioned specification, and any future revisions thereof. Bluetooth finds broad applicability wherever any two devices have previously required interconnection via cables. Thus, Bluetooth has been described as principally a "cable replacement" solution, meaning that it often can completely eliminate the need for cabling between connected nodes. LAN access is an important applications category for Bluetooth, but only one out of many. Bluetooth excels in providing automatic or semi-automatic connections for information exchange (frequently deferred) between devices that are regularly in close proximity (roughly 10 m of separation) and where low-power consumption is a priority for at least one of the devices.

A large number of Bluetooth-enabled devices have been proposed for use in homes, offices, and in cars. The proposed wireless-enabled devices include PCs, laptops, PDAs, keyboards, pointing devices (e.g. mice), mobile phones, pagers, cordless phones, fax machines, scanners, projectors, headsets, TVs, entertainment systems, appliances, LAN gateways, set-top boxes, point-of-sale terminals, and ATMs.

The IEEE 802.11 standard, which includes the 802.11b system, is described in detail in "IEEE Std 802.11-1997", from the IEEE 802.11 working group. The term 802.11b will be used to refer to wireless access mechanisms compliant with the aforementioned specification, and any future revisions thereof. 802.11b has been described as principally a "cable extension" solution, meaning that it often extends (wirelessly) the reach of existing cables but does not entirely eliminate the need for some cabling between connected nodes. 802.11b excels in providing a wireless Ethernet-like supplement to an existing LAN (providing Internet and Intranet access), particularly for wireless connections for multiple-hour continuous-use portable hosts that may move about anywhere within the general vicinity (roughly 100 m in radius) around the access-point coupling the 802.11b extension to the LAN.

The Global System for Mobile Communications (GSM) is a 2G WWAN system widely used throughout much of the world for digital mobile phones. GSM-based phones make use of a special removable smart card called a Subscriber Identity Module (SIM). The SIM contains a microcontroller with ROM and EEPROM. The SIM holds a variety of information including the International Mobile Subscriber Identity (IMSI), which uniquely identifies the subscriber, a subscriber private-key (Ki), a copy of the user PIN code, a user phone book, and other data.

Access is not granted to the GSM network unless the mobile phone is properly authenticated using a process that relies upon the SIM. (See the portion of FIG. 5A labeled "prior art.") The SIM identifies the mobile phone's user, not the mobile phone per se. If the user wants to change phones, the user is expected to do so by moving their SIM to the phone they want to use. As a first step in the authentication process, the user must enter their PIN for comparison by the SIM with the stored PIN value. The mobile phone will not grant access to the user unless the two instances of the PIN match.

Also held within the SIM are three authentication-related encryption algorithms. A8 is an algorithm used to generate a Signed Response (SRES) to a 128-bit random number (RAND). A5 is stream cipher algorithm that is used to encrypt the transmissions between the mobile phone and the base station to which it is connected. A3 is an algorithm used to generate a ciphering key (Kc), which is used as a session-key for the stream cipher.

A remote Authentication Center has one or more Authentication Servers that maintain copies of the IMSI and Ki for each subscriber and implements the same authentication-related encryption algorithms. When a GSM mobile-phone attempts to gain access to the GSM network via a base station, it provides the base station with the users IMSI. A pre-authentication Kc is used to stream cipher protect the transmission of IMSI, so the IMSI is never sent in the clear. The base station will forward the IMSI provided by the mobile-phone to the remote Authentication Server. The server uses the IMSI to lookup the Ki. The server also generates the 128-bit RAND. The server then generates instances of Kc and SRES that are functions of Ki and RAND. The server then sends RAND, Kc, and SRES to the base station, which provides the RAND to the mobile-phone.

Upon receiving the RAND, the mobile-phone's SIM uses its Ki and the stored encryption algorithms A8 and A3 to respectively generate its own instances of SRES and Kc. The mobile phone then passes its copy of SRES to the base station where it is compared with the SRES provided by the Authentication Server. If the two instances of SRES match, the mobile phone has been successfully authenticated and access is granted to the GSM network. Kc is subsequently used as a session-key for the A5 stream cipher. The foregoing authentication process is hereinafter referred to as SIM-based Authentication. Those skilled in the art will appreciate that the summary of SIM-based Authentication given above has been necessarily abridged.

Nokia (and possibly others) markets a Net Access Controller product that employs a derivative of the above-described SIM-based Authentication. (See the portion of FIG. 5B that is labeled "prior art.") The Nokia product permits laptop users with special SIM-equipped WLAN PC Cards to gain access to another network via an authentication-protected gateway.

By special arrangement, the same Authentication Server used by the GSM network is made accessible over a secure IP link to the Net Access Controller. Users on the WLAN take the same SIM that they use in their GSM mobile phone and place it into the special WLAN PC Cards.

For purposes of authentication, the Net Access Controller mimics the previously described role of the GSM base station. Specifically, the Net Access Controller receives user IMSIs via the WLAN and relays them over the secure IP link to the remote Authentication Server. Subsequently, the Net Access Controller receives the RAND, Kc, and SRES generated by the Server; provides the RAND to the WLAN device and thereby to the SIM; and compares the SIM-generated SRES to the Server-generated SRES. If the Net Access Controller determines that the two SRES copies match, it will authenticate the WLAN device and enable it to access the Internet (or an intranet).

Application development for wireless-enabled devices, including programming to communicate with the various levels of the wireless protocol stacks is known in the art. An example text that teaches such programming is "WAP, Bluetooth, and 3G Programming: Cracking the Code," by the Dreamtech Software Team, published by Hungry Minds, Inc., 2002. More specifically, chapter nine of the text teaches Bluetooth programming and chapter eleven teaches 3G (Third-generation mobile-phone technology) programming. As described in the text, the application development generally is first carried out in C or C++ using developer kits running on Win32 platforms prior to porting the application to the mobile device. Teleca Comtec of Sweden distributes a variety of Bluetooth development kits that teach and support Bluetooth programming. A development platform for 3G programming is the Binary Runtime Environment for Wireless (BREW), distributed by Qualcomm.

In spite of the wealth of wireless-enabled devices and the advances in wireless access, the interaction between multiple wireless-enabled devices has to date been of a limited nature, offering little more than basic support for automatically connecting and exchanging data as a cable-replacement function. What is needed are more sophisticated and improved techniques that better exploit the interactions between multiple wireless-enabled devices.

Existing security and authentication policies require remembering multiple passwords, installation of dedicated security dongles, dedicated security fobs, physical movement of smart cards (such as SIMs) or similar dedicated authentication hardware between multiple devices, or combinations of the foregoing. The result is that security policies remain primitive, difficult to use, and require dedicated devices that serve no other purpose. Users may shun or even be purposefully disable security policies, because they are not transparent, they require effort to use, or they interfere with the user's enjoyment or productivity. What is needed are more sophisticated and improved techniques, yet easier to use, in the areas of functionality, security, and authentication.

SUMMARY

The problems with the prior art may be overcome with improved techniques that permit policies, capabilities, privileges, and other functionalities of wireless-devices to be automatically adaptive under appropriate circumstances. Toward this end, the inventors observed that certain wireless-enabled devices (such as PDAs and mobile-phones) are typically of a personal nature, often have a one-to-one correspondence with a specific individual or organization, and that this correspondence has not been exploited. The inventors also observed that existing wireless-enabled devices have not fully exploited the proximity-centric nature of their operation.

The instant invention teaches improved functionality, security, and authentication, based on dynamic associations among wireless devices. In accordance with the invention, individual wireless devices communicate amongst each other exchanging identity information (e.g., a unique serial number used at the wireless access level, hereinafter referred to as a WXAN-ID), authentication-state or both, thereby forming a collaborative-collection of wireless devices. This collaborative-collection of wireless devices is then used as a basis for offering conceptual improvements over individual wireless devices in three areas.

First, device functions are affected by dynamic groupings of devices that are active-members of the collaborative-collection. This enables improved functionality. Second, the times-of-membership and times-of-non-membership of the devices in the collaborative-collection are monitored and this information is used to affect the function of individual devices in the collaborative-collection, including improved security and authorization policies. Third, the authentication-state of the active-member devices in the collaborative-collection affects the function of the active-member devices in the collaborative-collection, also adding to improved security.

In accordance with the present invention, the authentication-state of a given device may include, but is not limited to: the device's challenge/response history and status re passwords, PINs, security tokens, activity timers, SIM presence, authentication by a remote server, biometric matches, and other information. The authentication-state may also selectively incorporate selectively shared portions of the authentication-state of other devices in the collaborative collection as well as the WXAN-IDs of the other devices.

A personal wireless-enabled device, including but not limited to those of the prior art, primarily carried or worn for another (non-authentication) purpose, may be used in accordance with the invention as a key to authenticate the user to wireless-enabled resources that are protected in accordance with the invention. The wireless device serving as the authentication key will sometimes be referred to hereinafter as the authenticator device. The wireless-enabled resource being protected will sometimes be referred to hereinafter as the protected device. Thus in the absence of an authorized user's recognized authenticator device, unauthorized use of the protected device is prevented. Examples of personal electronic devices which are particularly suited to ancillary use as authenticator devices in accordance with the invention include: mobile-phones (including so-called cell-phones), portable games, watches, laptops, and other similar items that may be readily provisioned for WPAN access.

The invention is particularly applicable to the protection of devices, or device contents, having high intrinsic value, and which can be readily adapted to electronic locking or disabling. Examples of devices which may have particular application as benefiting from protection in accordance with the invention include: computer systems, desks, filing cabinets, doors, lighting systems, cameras, conveyances for passengers and goods (such as, but not limited to vehicles), and other similar items normally or readily equipped with an electrical switch or key. Protected devices will generally be resources that are within at least occasional WXAN-range of the user, may be permanently private to the user (i.e. personal property), temporarily private to the user (property of another made available for a limited time to the user), or a resource that is used at various times by various users.

As an example, a user's PDA may be wireless-enabled and used as an authentication key for the user's mobile phone. The user's mobile phone would be so configured as to not be functional unless in WPAN-range (communication proximity) to the user's PDA. Thus if the mobile phone is stolen from the user, moving it out of WPAN-range from the PDA, the phone would cease to be usable. Similarly, when the user checks into a hotel, the hotel room safe may be temporarily keyed to the user's PDA (more specifically it's WXAN-ID), and would open automatically (or optionally in response to a specific command) only if the user's PDA were in WPAN-range to the room safe.

The instant invention is not limited to merely preventing unauthorized use. It is also contemplated as a means to allow or re-enable authorized use after an event or condition occurs that denies use or invokes protection. Consider a scenario involving a user's wireless-enabled notebook computer and the user's wireless-enabled desk at the user's usual place of business. If the notebook computer is not in WPAN communication with the user's desk at least once every three days, the notebook computer may enter a lockout mode to prevent its further use in case it has been stolen. Full-privilege operation will only be restored if a correct response is received to a request for a special password. Alternatively, if the notebook computer is returned within WPAN-range of the user's desk and simultaneously is in WPAN-range of the user's PDA, the notebook may return to full functionality without a requirement for the special password. This form of variable security is transparent to the user, once installed and initialized, and provides the benefit of asset protection with little effort on the part of the user. Security mechanisms of this type are more likely to be used on a regular basis rather than disabled.

Conceptually the instant invention provides for the recognition of the potential for unauthorized use, based at least partially on detected proximity information (e.g., via WPAN-ID) between collections of the user's wireless-enabled devices, and having detected such a situation, modifying the functionalities, policies, and privileges of the appropriate wireless-enabled devices as required to prevent unauthorized access, or to re-enable access after it has been denied.

A refinement of the instant invention expands upon this capability by providing the user's wireless device with dynamic function and profile selection based more generally on current and past device associations. Local authentication, past and present proximity state, and past and present privilege state are used to select an appropriate application function profile, effectively providing the user with different functionality. This change in functionality is typically readily observable to the user, and occurs automatically and autonomously, as a result of changes in the described state, without any specific intervention or request by the user. As a further refinement, devices may share authentication state within these dynamic associations. This includes the specific authentication and identification information held in a SIM (or equivalent repository for authentication and identification information), or the SIM-based authentication status that a device has achieved via a SIM-based authentication server.

Collections of larger numbers of wireless-enabled devices, each according to the instant invention, offer further possibilities for selecting appropriate functionality and policies based on dynamic associations of the devices. Consider an application specific scenario where a user has a mobile phone and a PDA, each according to the instant invention, as well as a resource to protect, for example a laptop computer, also according to the instant invention. The laptop computer may monitor and log the time it is not in WPAN communication with either of the other two devices (the user's mobile-phone and the user's PDA). When the laptop detects that it has not been in contact with either of the mobile phone or PDA, individually, for longer than a threshold period of time, the laptop will select a lockout mode of functionality. Alternatively, when the laptop detects that it has not been in contact with both the mobile phone and the PDA, simultaneously, for longer than a threshold period of time, the laptop will select the lockout mode of functionality. Other variations are possible, as those of ordinary skill in the art will readily appreciate.

The instant invention may be further refined by providing selective functionality in a protected device in a way that links intervals of time without WPAN communications with an enabling device (acting as a virtual "key") to the degree of authentication ("strength") required to return the protected device to full-privilege operation. As an illustrative scenario consider a user's PDA and a user's mobile phone, each according to the instant invention. As previously described, if the mobile-phone is not in WPAN-range with the PDA, the PDA will not function, on the assumption that the PDA has been stolen and access to its capabilities and services should be denied. However, this may be too restrictive. Instead the PDA may monitor how long it has been out of WPAN-range with the mobile-phone, and based on this time allow an alternate method of authorization for return to full-privilege. There may be several strengths of authentication requirements, increasing in security as the time period without WPAN communication with the mobile-phone increases. After this period exceeds a first, shortest, threshold, it may be sufficient to provide a password to enable the PDA. After a second, longer, threshold, the user may be required to provide a security device (such a SIM or smartcard) before using the PDA. After a third, longest, threshold, some form of biometric authentication may be required to restore the mobile-phone functionality.

The instant invention may also use these various forms of authentication in a more general way to provide various levels of authentication, corresponding to different levels of application privilege, in conjunction with WXAN-ID matching. The lowest level of authentication (level 0, the least privileged) would exist when no WXAN-ID match occurred, for whatever reason. The next more privileged authentication state, level 1, would be attained after a WXAN-ID match was made with a designated device (acting as a key). Level 2 authentication would include level 1 requirements as well as a user provided password. Level 3 authentication would include level 2 in addition to requiring that a SIM be present in the device acting as a key. Level 4 authentication would require level 3 as well as SIM-based server authentication of the device acting as a key (more than mere matching of the level 1 and 2 information). Level 5, the most privileged, would require level 4 along with some form of biometric match.

The instant invention is also applicable in situations where a protected device is used at different times by different users. Thus in a further embodiment the protected resource can selectively determine its security policy or otherwise provide different privileges or functionality in a protected device based on the particular WXAN-ID of the encountered proximate authenticator device. Specifically, the protected device could recognize each of multiple WXAN-IDs and provide a respective predetermined level of access or functionality to the current proximate user. When an authenticator device comes within range its WXAN-ID is provided to the protected device, and the protected device checks if the ID matches with any authorized IDs. If no match is found, the device provides limited or no access. If the WXAN-ID is identified by the protected device, the level of access (or set of functions) associated with that particular ID is made available. In a specific multi-user scenario, such a protected device might be a vehicle that is wireless-enabled (e.g., using Bluetooth) in accordance with the present invention. If no authorized WXAN-ID is recognized, key functions of the vehicle are disabled and physical access to the inside of the vehicle is optionally restricted. If a user approaches with a recognized authenticator device (e.g., a Bluetooth-enabled mobile phone or PDA) the automobile could optionally unlock the door to provide physical access within the vehicle. If the user is recognized as being the vehicle's owner, unrestricted use of the vehicle's functions is provided. If the user is recognized as being the owner's 16-year old son, the vehicle restricts the top speed permitted or initiates GPS monitoring of the car.

Sample Illustrative Methods and Apparatus

This summary section concludes with a collection of paragraphs that tersely summarize illustrative methods and apparatus in accordance with the invention. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusions section, the invention encompasses all possible modifications and variations within the scope of the issued claims, which are appended to the very end of the patent.

An enhanced wireless device for selective operation in a group of wireless devices, the enhanced wireless device comprising: a wireless access mechanism; storage for holding data and code, the data including state information for the enhanced wireless device, the state information including current authentication status, the code including routines to implement a wireless access communications protocol stack, selectively update the state information, and support dynamic selection between at least a first and second function; a processor for selectively executing the routines, the processor coupled to the wireless access mechanism and the storage; wherein the current authentication status includes mutually exclusive exchanged and non-exchanged authentication states with respect to at least one other wireless device of the group; and wherein the enhanced wireless device dynamically selects between the functions as a result of a change in the current authentication status.

An enhanced wireless device for selective operation in a group of wireless devices, the enhanced wireless device comprising: a wireless access mechanism; storage for holding data and code, the data including state information for the enhanced wireless device, the code including routines to implement a wireless access communications protocol stack, selectively update the state information, and support dynamic selection between a first and second function; a processor for selectively executing the routines, the processor coupled to the wireless access mechanism and the storage; and wherein the state information includes a log representing a membership history of the enhanced wireless device with respect to the group, the log having at least one set of records corresponding to either times of membership or times of non-membership. A variation on the foregoing wherein the enhanced wireless device dynamically adopts one of the first and second functions. A variation on the foregoing wherein the dynamic adoption is based at least partially on information in the log. A variation on the foregoing wherein the adoption is based upon the log indicating non-membership in the group for greater than a first threshold value of time.

An enhanced wireless device for selective operation in a group of wireless devices, the enhanced wireless device comprising: a wireless access mechanism; storage for holding data and code, the data including state information for the enhanced wireless device, the state information including current authentication status, the code including routines to implement a communications protocol stack, selectively update the state information, and support dynamic selection between a first and second function; a processor for selectively executing the routines, the processor coupled to the wireless access mechanism and the storage; wherein the state information includes a log representing a membership history of the enhanced wireless device with respect to the group, the log having at least one set of records selected corresponding to either times of membership or times of non-membership, the current authentication status including mutually exclusive exchanged and non-exchanged authentication states with respect to at least one other wireless device of the group; and wherein the enhanced wireless device dynamically selects between the first and second function based at least in part on the log and the current authentication status.

A wireless system, comprising: a collaborative-collection of a plurality of wireless devices; wherein at least a first wireless device in the collaborative-collection includes a connection to a wide area wireless access; and the wide area wireless access connection is accessible by at least a second wireless device in the collaborative-collection. A variation on the foregoing system, wherein the wide area wireless access is coupled to a server. A variation on the foregoing system, wherein the wide area wireless access includes the Internet protocol. A variation on the foregoing system, wherein the wide area wireless access includes the GSM protocol. A variation on the foregoing system, wherein the second wireless device is enabled to exchange authentication-state via the wide-area access. A variation of the foregoing system, wherein the second wireless device is enabled to exchange authentication-state with the wide-area access. A variation on the foregoing system, wherein active-membership in the collaborative-collection is established via a Bluetooth wireless mechanism, or an 802.11 wireless mechanism. A variation on the foregoing system, wherein active-membership in the collaborative-collection is established via a wireless access mechanism including a capability for a logical connection between every pair of wireless devices in the collaborative-collection. A variation on the foregoing system, wherein the logical connection is formed by a physical connection between every pair of wireless devices in the collaborative-collection. A variation on the foregoing system, wherein the logical connection is formed by a physical connection between every wireless device in the collaborative-collection and a master wireless device.

A method of modifying the functionality of a wireless device system, comprising the steps of: establishing in-contact status between a plurality of wireless devices in the wireless device system; exchanging identification information between the plurality of wireless devices, thereby forming an active-collaborative-collection of the plurality of wireless devices; and modifying functionality of at least a first wireless device in the plurality of wireless devices at least partially based on active-membership of the first wireless device in the active-collaborative-collection. A variation on the foregoing method, further comprising the steps of: monitoring in-contact status to determine when the first wireless device is no longer an active-member in the active-collaborative-collection; and undoing the modification to functionality of the first wireless device at least partially based on loss of active-membership in the active-collaborative-collection.

A method of modifying the functionality of a wireless device system, comprising the steps of: establishing in-contact status between a plurality of wireless devices in the wireless device system; exchanging identification information between the plurality of wireless devices, thereby forming an active-collaborative-collection of the plurality of wireless devices; communicating authentication-state to at least a first wireless device in the plurality of wireless devices from at least a second wireless device in the plurality of wireless devices; and modifying functionality of the first wireless device at least partially based on the communicated authentication-state.

A method of modifying the functionality of a wireless device system, comprising the steps of: monitoring in-contact status between a plurality of wireless devices in the wireless device system; recording the monitored in-contact status as times-of-membership, times-of-non-membership, or both in a log; and modifying functionality of at least a first wireless device in the plurality of wireless devices at least partially based on information in the log.

A method of modifying the functionality of a wireless device system, comprising the steps of: establishing in-contact status between a first plurality of wireless devices in the wireless device system; exchanging identification information between the first plurality of wireless devices, thereby forming an active-collaborative-collection of the first plurality of wireless devices; monitoring in-contact status between a second plurality of wireless devices in the active-collaborative-collection; recording the monitored in-contact status as times-of-membership, times-of-non-membership, or both in a log; communicating authentication-state from at least a first wireless device in the second plurality of wireless devices to at least a second wireless device in the second plurality of wireless devices; and modifying functionality of the first wireless device at least partially based on: information in the log; and the communicated authentication-state. A variation on the foregoing method, wherein the establishing of in-contact status and the exchanging of identification information is via a Bluetooth wireless mechanism, or an 802.11 wireless mechanism.

A method of modifying the functionality of a first wireless device, comprising the steps of: establishing in-contact status between the first wireless device and a second wireless device; exchanging identification information between the first wireless device and the second wireless device, thereby forming an active-collaborative-collection between the first wireless device and the second wireless device; and modifying functionality of the first wireless device at least partially based on active-membership of the first wireless-device in the active-collaborative-collection. A variation on the foregoing method, further comprising the steps of: monitoring in-contact status between the first wireless device and the second wireless device to determine loss of active-membership of the first wireless device in the active-collaborative-collection; and undoing the modification to functionality of the first wireless device at least partially based on the loss of active-membership.

A method of modifying the functionality of a first wireless device, comprising the steps of: exchanging identification information between the first wireless device and a second wireless device, thereby forming an active-collaborative-collection between the first wireless device and the second wireless device; communicating authentication-state from the second wireless device to the first wireless device; and modifying functionality of the first wireless device at least partially based on the communicated authentication-state.

A method of modifying the functionality of a first wireless device, comprising the steps of: monitoring in-contact status between the first wireless device and a second wireless device; recording the monitored in-contact status as times-of-membership, times-of-non-membership, or both in a log; and modifying functionality of the first wireless device at least partially based on information in the log.

A method of modifying the functionality of a first wireless device, comprising the steps of: establishing in-contact status between the first wireless device and a second wireless device; exchanging identification information between the first wireless device and the second wireless device, thereby forming an active-collaborative-collection between the first wireless device and the second wireless device; monitoring in-contact status between the first wireless device and the second wireless device; recording the monitored information as times-of-membership, times-of-non-membership, or both in a log; communicating authentication-state from the second wireless device to the first wireless device; and modifying functionality of the first wireless device at least partially based on: information in the log; and the communicated authentication-state. A variation on the foregoing method, wherein the establishment of in-contact status and the exchange of identification information is via a Bluetooth wireless mechanism, or an 802.11 wireless mechanism.

A wireless device apparatus, comprising: a wireless access mechanism coupled to a protocol stack; state information coupled to the protocol stack; and a function block coupled to the state information; wherein the function block provides a first functionality when the wireless device is not an active-member in any collaborative-collection, and provides a second functionality when the wireless device is an active-member in a first collaborative-collection. A variation on the foregoing apparatus, wherein the wireless access mechanism is a Bluetooth wireless mechanism, or an 802.11 wireless mechanism.

BRIEF DESCRIPTION OF DRAWINGS

FIG. 2 defines a set of status-indicator symbols used in the drawings of the present invention to convey the status and capabilities of each wireless device.

FIGS. 3A and 3B provide illustrative uses of the symbols used in the drawings of the present invention.

FIGS. 4A and 4B illustrate two wireless devices capable of participating in a collaborative-collection of wireless devices, in accordance with a second illustrative embodiment of the present invention. In FIG. 4A the two devices are not in-contact. In FIG. 4B the two devices are in-contact and form an active-collaborative-collection.

In FIG. 4C the three devices are not in-contact. In FIG. 4D the three devices are in-contact and form an active-collaborative-collection.

In FIG. 4E two of the three devices are in-contact, forming an active-collaborative-collection, while the remaining third device is not an active-member of the active-collaborative-collection. In FIG. 4F the three devices are in-contact and form an active-collaborative-collection.

FIG. 5A illustrates how association-based policies of a first device may depend upon the existence of a collaborative-collection with a SIM-authenticated second device (i.e., the second device is authenticated by a SIM-based authentication server). FIG. 5B illustrates how a collaborative-collection may permit a device without a SIM to become SIM-authenticated.

FIG. 9A illustrates the state of the two devices prior to exchange of authentication-state. FIG. 9B illustrates the state of the two devices after exchange of authentication-state.

DETAILED DESCRIPTION

Nomenclature

Figure 1A:
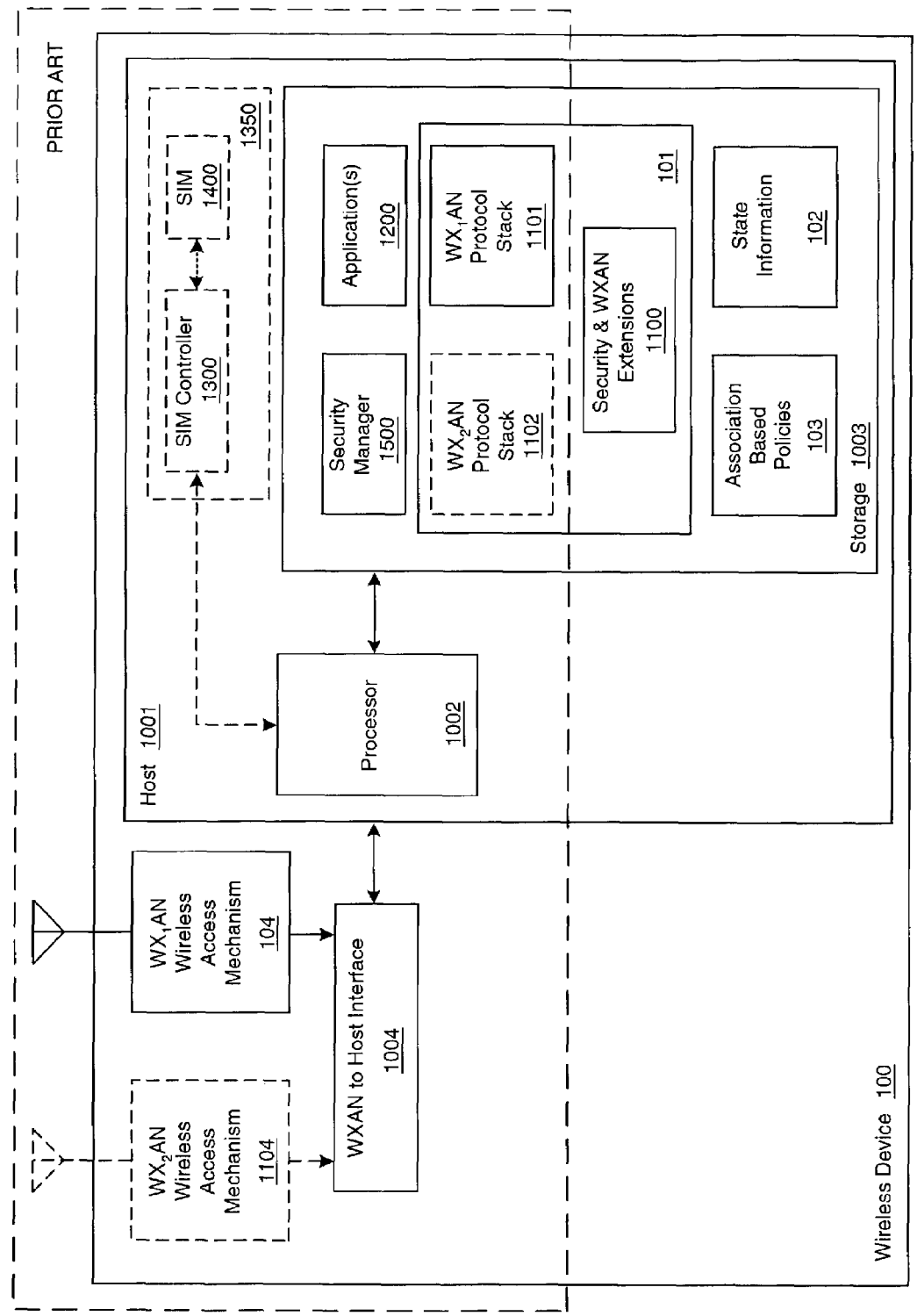
FIG. 1 illustrates a wireless device having a protocol stack, state information storage, a function block, and a wireless access mechanism, in accordance with a first illustrative embodiment of the present invention.

As in other fields, in the wireless industry certain common terms find repeated application at different levels of the design hierarchy and otherwise may be used with varying scope. As a result, it is possible that certain terms used in this application have multiple context dependent meanings. Those of ordinary skill in the art will always be able to readily ascertain the correct meaning from careful study of the text, including the following terminology clarifications, and accompanying drawings.

Particular attention is required with regard to the terms wireless access, mobile wireless device, fixed wireless device, in-contact, collaborative-collection, active-collaborative-collection, active-member, closed-collaborative-collection, open-collaborative-collection, time-of-membership, time-of-non-membership, authentication-state, full-privilege, no-privilege, and identity. Accordingly, our usage of these terms is clarified as follows.

The term wireless access represents any mechanism for communication between two or more devices without a physical connection (such as a cable). Illustrative mechanisms would be radio frequency or optical communication, as these transmit and receive information between devices without requiring any type of physical connection between devices.

To avoid confusion with Wireless Wide Area Networks (WWAN), we will use the notation WXAN refer to the superclass of all Wireless Access Networks discussed in the background section. Subscripts will be used to distinguish between multiple sub-classes, without explicit specification of either sub-class. Thus references to both $WX_1AN$ and $WX_2AN$ in a given embodiment refer to two different types of Wireless Access Networks. Unless contextually further limited, each of $WX_1AN$ and $WX_2AN$ may be of any Wireless Access Network type so long as they are different types.

For brevity and clarity, except where we explicitly distinguish among the WWAN, WMAN, and WGAN types of WXAN, an isolated reference herein to WWAN (or to "wide area wireless access") should be taken to encompass the WWAN, WMAN and WGAN types. Likewise, except where we explicitly distinguish among the WPAN and WLAN types of WXAN, an isolated reference herein to WLAN (or to "local area wireless access") should be taken to encompass the WPAN and WLAN types.

In this description there are two types of wireless access: a local wireless access and a wide area wireless access. The local wireless access is between devices in relatively close physical proximity and is transient in nature, using methods of discovery and identification to inform devices of movement into or out of the local area. Wide area wireless access, on the other hand, is over arbitrarily long distances, and may use several intermediate mechanisms for implementation, including Internet protocol, for example. Unless otherwise stated, in this description the term wireless device is meant to be a device having at least local wireless access capability.

It is also useful to categorize wireless devices into two broad categories: mobile and fixed. A mobile wireless device is one that is easily movable in customary use. Examples of mobile wireless device applications contemplated in conjunction with the present invention, include: portable communications devices (i.e., a device with a primary communications capability distinct from the local area wireless function), such as a mobile-phone; portable computer hosts, such as a personal digital assistant (PDA); and portable communications and computer hybrid devices. A fixed wireless device, on the other hand, customarily remains in a single position while in use, even though it may be possible to change its position. Examples of fixed wireless device applications contemplated in conjunction with the present invention, include: at, on, or in a desk or other such station; or in, or in proximity to, a room or other such space, including at its outside entrance. In this description the term wireless device, without qualification, is meant to be either a mobile or a fixed wireless device.

Two wireless devices are said to be "in-contact" when the effective signal strength of the local wireless access mechanism logically connecting them is sufficient to enable information exchange between the two devices. Devices too distant or in conditions otherwise preventing mutual communication are "not in-contact" with each other. Physical movement of either device is the most obvious mechanism to effect a change in signal strength, and hence to alter the in-contact status between wireless devices. However, other changes in conditions or protocol may also directly or indirectly affect signal strength. The communication protocol or device state (powered off, powered on, or standby mode) may also manifest as signal strength and hence in-contact status.

The term "collaborative-collection" is used to describe two or more wireless devices, in accordance with the present invention, enabled to recognize and respond to like devices. Such a collaborative-collection is considered to be active (an "active-collaborative-collection") when two or more member devices of the collaborative-collection are in-contact. A device, in accordance with the present invention, in-contact with another such device, and thus enabling the formation of an active-collaborative-collection, is said to be an "active-member" (of the active-collaborative-collection). Any devices not in-contact, and thus not part of the (possibly active) collaborative-collection, are considered "inactive-members" of the collaborative-collection.

Collaborative-collections are also classified according to when the members of the collaborative-collection are defined. A "closed-collaborative-collection" is static, with a priori knowledge of the maximal members of the collaborative-collection, while an "open-collaborative-collection" is dynamic, with membership defined on the fly. It is understood that even though the universe of members of a closed-collaborative-collection are defined at inception, when the collaborative-collection is active the active-membership is dynamic. In other words, the in-contact devices that are active in the collaborative-collection may change over time. An open-collaborative-collection may be defined by any chosen criteria, ranging from any wireless device in accordance with the invention (without restriction) to a subset according to available functions and so forth. One illustrative way to define the members of an open-collaborative-collection is via a shared security key, or list of such keys.

The term "time-of-membership" refers to the time interval when a device, in accordance with the present invention, is an active-member of an active-collaborative-collection. A time-of-membership is therefore specific to a particular active-collaborative-collection, and hence a device has multiple times-of-membership if it is simultaneously an active-member in more than one active-collaborative-collection. Similarly the term "time-of-non-membership" refers to the time interval when a device, in accordance with the present invention, is an inactive-member of a given collaborative-collection. Time-of-non-membership is thus also specific to a given device and collaborative-collection.

Devices in accordance with the present invention may retain "authentication-state" representing a login name and password, secret key from a secure digital device insertion, or any other such mechanism enabling privileged user operations. Such authentication-state may have various values allowing for multiple levels of privileged operations. The term "full-privilege" is used to describe a device with authentication-state allowing any operation possible on a device in accordance with the present invention, while the term "no-privilege" is used to describe a device with authentication-state disallowing all user operations except the gathering of authentication-state (prompting for a login name and password, for example). As described in more detail later, it is possible for authentication-state to take on any number of values representing varying degrees of privilege.

The term identity is used to refer to one or more of the following means of distinguishing capabilities or unique instances amongst wireless devices: a generic class identifier (such as phone or notebook computer), a specific class identifier (brand), an enumeration of capabilities (such as data communication rate or available memory), a Bluetooth device address, an 802.11 device identifier, a MAC address, a security code, a shared authentication code, or any other similar characteristics of a group of wireless devices or a unique instance of a wireless device.

Enhanced Wireless Device

Figure 1B:
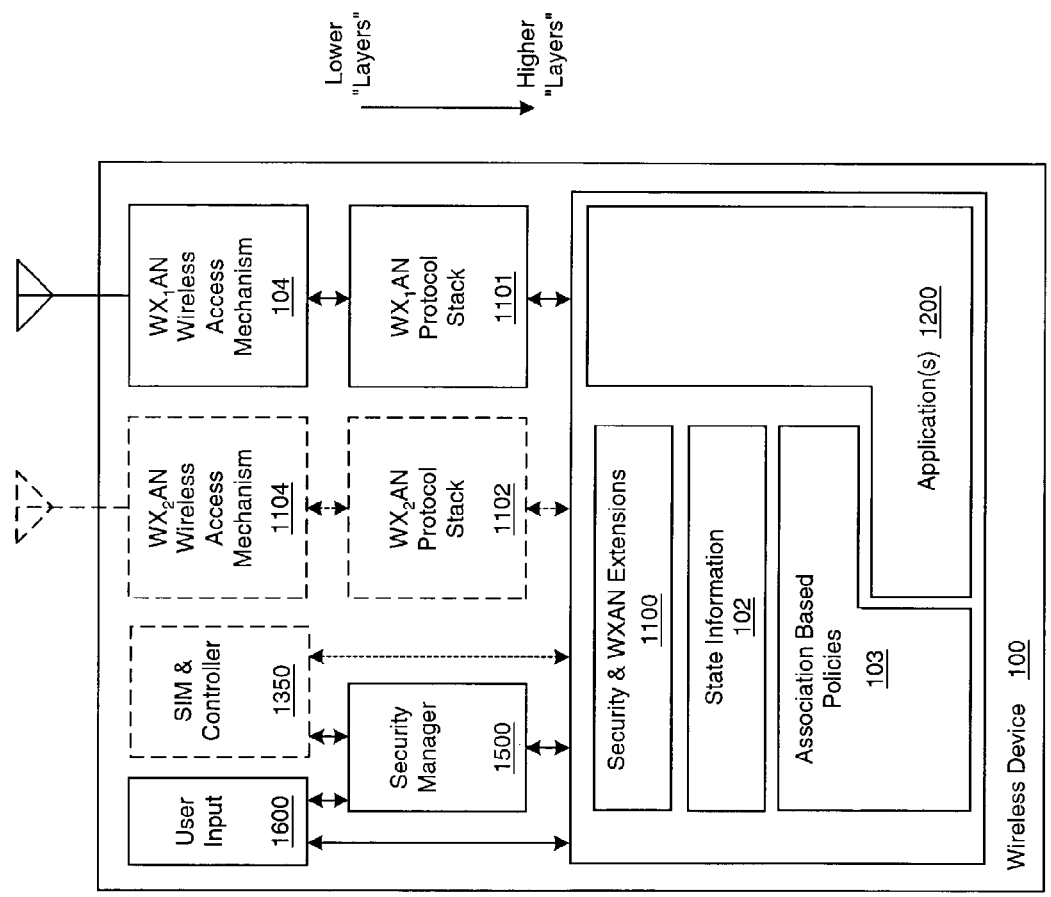
Figure 1C:
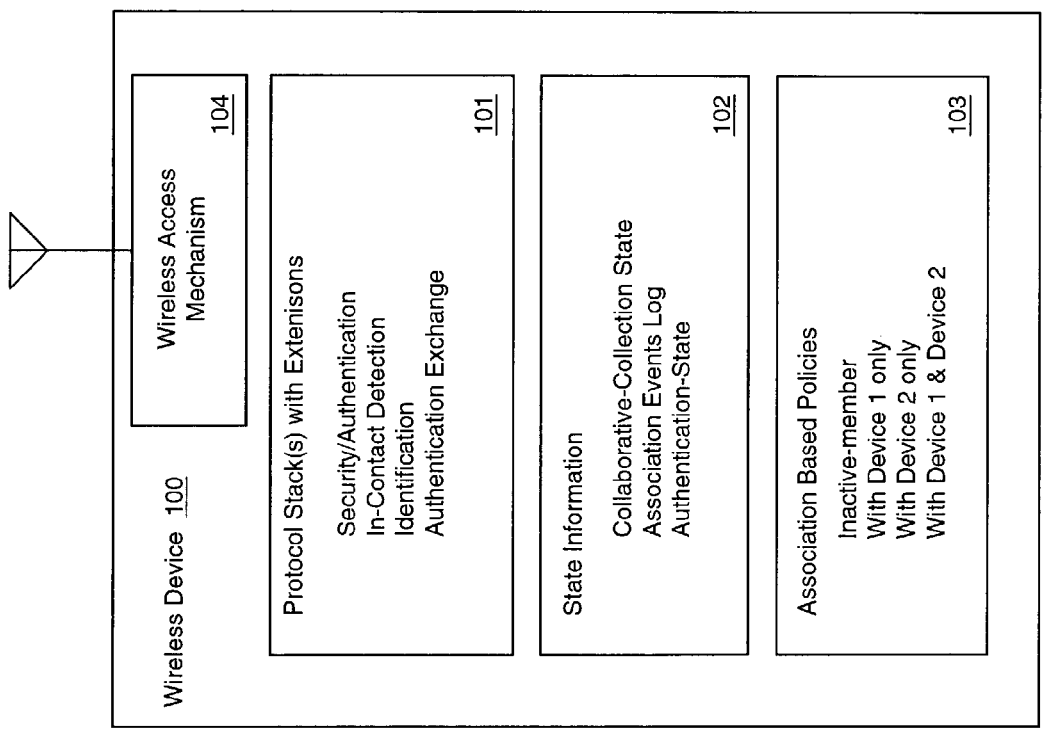

FIGS. 1A through 1C are different views of the same illustrative embodiment of enhanced wireless device 100 in accordance with the present invention. FIG. 1A provides a hardware-centric view. FIG. 1B is a layered hierarchical software-stack view. FIG. 1C is a simplified view chosen to highlight a particular sub-set of the functions of the present invention.

FIGS. 1A through 1C are intended to be applicable to a range of wireless device types, including but not limited to, mobile phones, PDAs, desktop PCs, and laptops. It is within the knowledge and ability of those skilled in the art to select and customize features in a manner appropriate to the specific type being implemented and the particular constraints of a given design.

It will be further understood by those skilled in the art that the boundaries between the various blocks illustrated in FIGS. 1A through 1C are arbitrary and have been chosen in part to highlight the functional additions of the present invention over the prior art. It is anticipated that in certain implementations many of these functions may be intertwined or may exploit commonalities of code or hardware in ways that may redraw or blur the boundaries illustrated.

In FIG. 1A, various blocks are shown implemented via software routines resident in Storage 1003 of host processing block 1001. Those skilled in the art will recognize that Storage 1003 could be implemented in any number of diverse ways including a combination of multiple memory types. In preferred PDA and mobile-phone embodiments of wireless device 100, all of the functions shown within Storage 1003 are implemented using flash memory, a form of selectively writable non-volatile memory. In preferred desktop PC and laptop embodiments of wireless device 100, certain functions are implemented in firmware (such as read-only and flash-based variants), while others are loaded as required into a hierarchical cache and main memory system from mass storage.

In FIGS. 1A and 1B, wireless device 100 includes a first wireless access mechanism 104 and an optional second wireless access mechanism 1104 coupled to the host 1001 via interface 1004. Wireless device 100 further includes protocol stack(s) 1101 and (optionally) 1102, corresponding respectively to the wireless access mechanisms 104 and 1104.

Security Manager 1500 selectively enables access to various wireless device functions based on user input 1600 and on exchanges with optional block 1350, comprising a Subscriber Identity Module (SIM, 1400) and an associated Controller 1300. Security and WXAN Extensions 1100 sits at a higher architectural software-layer above the Security Manager 1500 and Protocol Stacks 1101 and 1102.

While reliant upon lower-level software functions for hardware access and other services, it is the higher-level software functions that ultimately define the nature, range of capabilities, and sophistication of wireless device 100. Application(s) 1200 includes such higher-level functions. In an illustrative embodiment, Association Based Policies 103 also provides higher level functions as well as providing services to Application(s) 1200. It will be appreciated by those skilled in the art that in a given implementation, the Association Based Polices block 103 may provide only one of these functional-layer interfaces.

In FIG. 1C, there are four blocks: a protocol stack 101, state information 102, a function block 103, and a wireless access mechanism 104. Wireless access mechanism 104, based on the Bluetooth standard in the preferred embodiment, provides wireless communication with other wireless devices, including those in accordance with the present invention.

State information 102 records collaborative-collection state, an association events log, and authentication-state. The collaborative-collection state records active-membership by device 100 in collaborative-collections. In an illustrative embodiment the association events log is a time-of-membership log which provides a time history of when device 100 was an active-member of one or more collaborative-collections, and when it was not. It may also record when other devices were in-contact with device 100. The authentication-state is a container for device 100 to store its own authentication-state as well as the authentication-state from any in-contact active-members of any active-collaborative-collections for which device 100 is an active-member.

Function block 103 implements association based polices for the device. In an illustrative embodiment these policies include a first set of association based polices operational when the device is not an active-member of any collaborative-collection, a second set of association based polices available when the device is an active-member of a collaborative-collection with a first device, a third set of association based polices active when device 100 is an active-member of a collaborative-collection with a second device, and a fourth set of association based polices active when device 100 is an active-member of a collaborative-collection with both a first and second device.

Protocol stack 101, implemented in firmware in the preferred embodiment, provides functions for security and authentication, in-contact detection, identification, and authentication-state exchange. Protocol stack 101 uses the in-contact detection and identification mechanisms to monitor when device 100 is an active-member of one or more collaborative-collections, using wireless access mechanism 104. Protocol stack 101 also uses wireless access 104 to determine what other devices are also active-members of these same active-collaborative-collections. This information is passed to state information block 102 where it is recorded as part of the collaborative-collection state and time-of-membership log. Similarly, protocol stack 101 monitors when device 100 is not in-contact with other devices in the collaborative-collection, and this is also sent to state information block 102 for recording in the collaborative-collection state and time-of-membership log. Protocol stack 101 uses the authentication-state exchange mechanisms via wireless access 104 to obtain authentication-state from other active-members in an active-collaborative-collection and stores this in the authentication-state area of state information block 102. Protocol stack 101 also uses the authentication-state exchange mechanism via wireless access 104 to provide the authentication-state values in state information block 102 to other active-members of active-collaborative-collections device 100 may be an active-member in from time to time. This may include authentication-state information device 102 has obtained from other active-members of the collaborative-collection in addition to the authentication-state directly associated with device 100.

Function block 103 implements the association based polices of device 100, and is made aware of the changes to data in state information block 102. Functions are modified, added, or deleted according to various policies determined in part by examining the data in state information block 102. Changes in the collaborative-collection active-membership and authentication-state obtained from other active-members are thereby used to alter the functionality of device 100. Functionality represented by "Inactive-member" in function block 103 is available whenever device 100 is not an active-member of a collaborative-collection. Functionality represented by "With a first device" is active whenever device 100 is an active-member of a collaborative-collection also including said first device. Similarly, functionality "With a second device" is enabled when device 100 is an active-member of a collaborative-collection including said second device. In an illustrative embodiment these association based polices are security access policies and the functionality being altered for the device are the security policies the device provides. Hence, in accordance with the present invention a device's security policies may be different depending on the device's active-membership in one or more active-collaborative-collections.

While protocol stack 101 is illustrated as implemented in firmware, any combination of software and hardware is possible, as readily ascertained by one of ordinary skill in the art. Furthermore, the software need not reside permanently in the device (any portion of it may be downloaded via wireless access mechanism 104, for example). Lastly, the functionality shown in block 103 is illustrative only. Any number of functions or combinations of functions varied according to an arbitrary number of collaborative-collections, each with an arbitrary number of member devices, may be implemented by one of ordinary skill in the art.

The illustrations of the present invention are better understood using a set of symbols to represent the active-member or inactive-member state, the privilege state (full-privilege or no-privilege), the stored authentication-state, and functions available in the device. These symbols are listed in FIG. 2. Symbol 200, a first extinguished indicator (a shaded circle), represents a device that is not an active-member of a collaborative-collection, while symbol 201, a first lit indicator (an unshaded circle with radial lines), represents a device that is an active-member of a collaborative-collection. Symbol 202, a locked padlock, signifies a device disallowing all user operations (no-privilege), awaiting authentication to enable full-privilege user operations, while Symbol 203, an unlocked padlock, signifies a device allowing full-privilege user operations. Symbol 204, a file folder with an "A", represents an authentication-state container holding the authentication-state of the device the folder is contained in. Symbol 205, a file folder with an "A" and an "X" in a circle, represents an authentication-state container holding authentication-state from another active-member device of a collaborative-collection (this is the "X" in the circle), along with the authentication-state of the device the folder is contained in (this is the "A").

Symbols 206, 207, 208, and 209 represent functions available in a device. Symbol 206, $F_A$, represents function A, symbol 207, $F_{A*}$ represents function A with some modification, symbol 208, $F_A$ in a circle, represents a new function A (not present in the device until it became an active-member in a collaborative-collection), and symbol 209, $F_A$ superimposed with a crossed-out circle, represents a deleted function A (removed when the device became an active-member in a collaborative-collection).

Symbol 210, a crossed-out circle superimposed over a box labeled "SIM," represents explicitly that a SIM is not present. Symbol 211, a box labeled "SIM," represents explicitly that a SIM is present. Symbol 212, a second extinguished indicator (a shaded square), represents a device that is not authenticated by a remote SIM-based Authentication Server. Symbol 213, a second lit indicator (an unshaded square with radial lines), represents a device that is authenticated by such a Server.

Examples of the use of these symbols are shown in FIG. 3A and FIG. 3B, showing a wireless device in accordance with the present invention. In FIG. 3A, wireless device 300 is shown with active-member indicator 301 extinguished (meaning the device is not an active-member of a collaborative-collection), privilege indicator 302 as a locked padlock (meaning no-privilege), file folder 303 with an "A" inside (indicating device 300 authentication-state A stored in the authentication-state container), function $F_B$ 304 (indicating the availability of function $F_B$), function $F_A$ 305 (indicating the availability of function $F_A$), extinguished authentication indicator 306 (meaning the device is not authenticated by a SIM-based Server), and circled and crossed-out SIM 307 (indicating explicitly that no SIM is present).

In FIG. 3B, wireless device 300 is shown with active-member indicator 301 lit (meaning the device is an active-member of a collaborative-collection), privilege indicator 302 as an unlocked padlock (meaning full-privilege), file folder 303 having an "A" (indicating device 300 authentication-state A) and a circled "B" inside (indicating authentication-state "B" from some other member of the collaborative-collection stored in the authentication-state container), circled and crossed-out function $F_B$ 304 (indicating the deletion of function $F_B$), function $F_{A*}$ 305 (indicating the availability of modified function $F_{A*}$), circled function $F_C$ 306 (indicating the availability of a new function $F_C$), lit authentication indicator 306 (meaning the device is authenticated by a SIM-based Server), and SIM 307 (indicating explicitly that a SIM is present).

Active-Collaborative-Collection of Devices Affects Individual Device Functions

The first area of the present invention is when two or more distinct wireless devices, each in accordance with the present invention, become in-contact with each other to form an active-collaborative-collection of wireless devices, and that active-member status in the active-collaborative-collection affects one or more of the functions in the device. More specifically, as a mobile wireless device in accordance with the present invention moves within local wireless access communication range of another wireless device also in accordance with the present invention (mobile or fixed), a process of discovery is initiated whereby the devices exchange information via the wireless access in both directions, including but not limited to identity. The devices thus form a collaborative-collection of wireless devices. While a device is an active-member of an active-collaborative-collection formed in this manner, one or more of the functions provided by the device may be different than when the device is not an active-member of the collaborative-collection. New functions may be provided, existing functions may be altered, existing functions may be deleted, or any combination of new, altered, or deleted functions may result due to the device being an active-member in the active-collaborative-collection.

As a variation on each of the embodiments otherwise described herein, the present invention may also require authentication as a requirement for a device to become an active-member of a collaborative-collection, in addition to the in-contact status and exchange of identify information.

Wireless devices according to the present invention recognize changes in in-contact status. As described above, this is most easily understood in the context of a mobile wireless device moving from one location to another, thus increasing and decreasing proximity with respect to another wireless device, thereby affecting the signal strength between the devices and therefore the in-contact status. However, as described in the definition of in-contact, there is no requirement for movement of either device to change the in-contact status, only a change in effective signal strength of the underlying local wireless access mechanism. As discussed in more detail later, those of ordinary skill in the art will recognize that many factors affect signal strength. As an illustration of this, one of the devices could be powered off, and thus not in-contact, and then powered on, thus becoming in-contact, with no physical movement.

In an illustrative scenario, consider that a notebook computer (a mobile device) may require a password before each use when it is not an active-member of a collaborative-collection, but when it is an active-member of a active-collaborative-collection with a wireless-enabled desk (a fixed wireless device) it may not require a password. Consider a second illustrative scenario with two mobile devices, a cell phone in a collaborative-collection with a personal digital assistant (PDA). When the phone is in-contact with the PDA and thereby forming an active-collaborative-collection with the PDA, the PDA offers full-privilege operation to the user. However, when the phone is not in-contact with the PDA and thus there is no active-collaborative-collection, the PDA is in a no-privilege state and requires a password before allowing use.

Thus, the collaborative-collection taught herein permits a WPAN or WLAN-enhanced personal item (such as a mobile-phone) to be used effectively as a key to unlock (gain access to) an otherwise restricted resource. This is illustrated in further detail in the second illustrative embodiment of FIG. 4A and FIG. 4B, discussed in detail below.

FIG. 4A shows two wireless devices 400 and 401, according to the present invention, enabled to detect and communicate with each other but separated by distance 409 such that communication and hence proximity detection and identification are not possible. Thus the devices are not in-contact, and are not active-members of an active-collaborative-collection, as shown by the extinguished indicators appearing in the lower left-hand corners of the two devices. In this state wireless device 401 has two functions $F_A$ and $F_B$. Similarly, wireless device 401 has two functions $F_C$ and $F_D$. Those of ordinary skill in the art will recognize that an identity of function may exist between $F_A$ and $F_C$, for example, but for purposes of generality are illustrated here as unique functions.

Figure 4B:
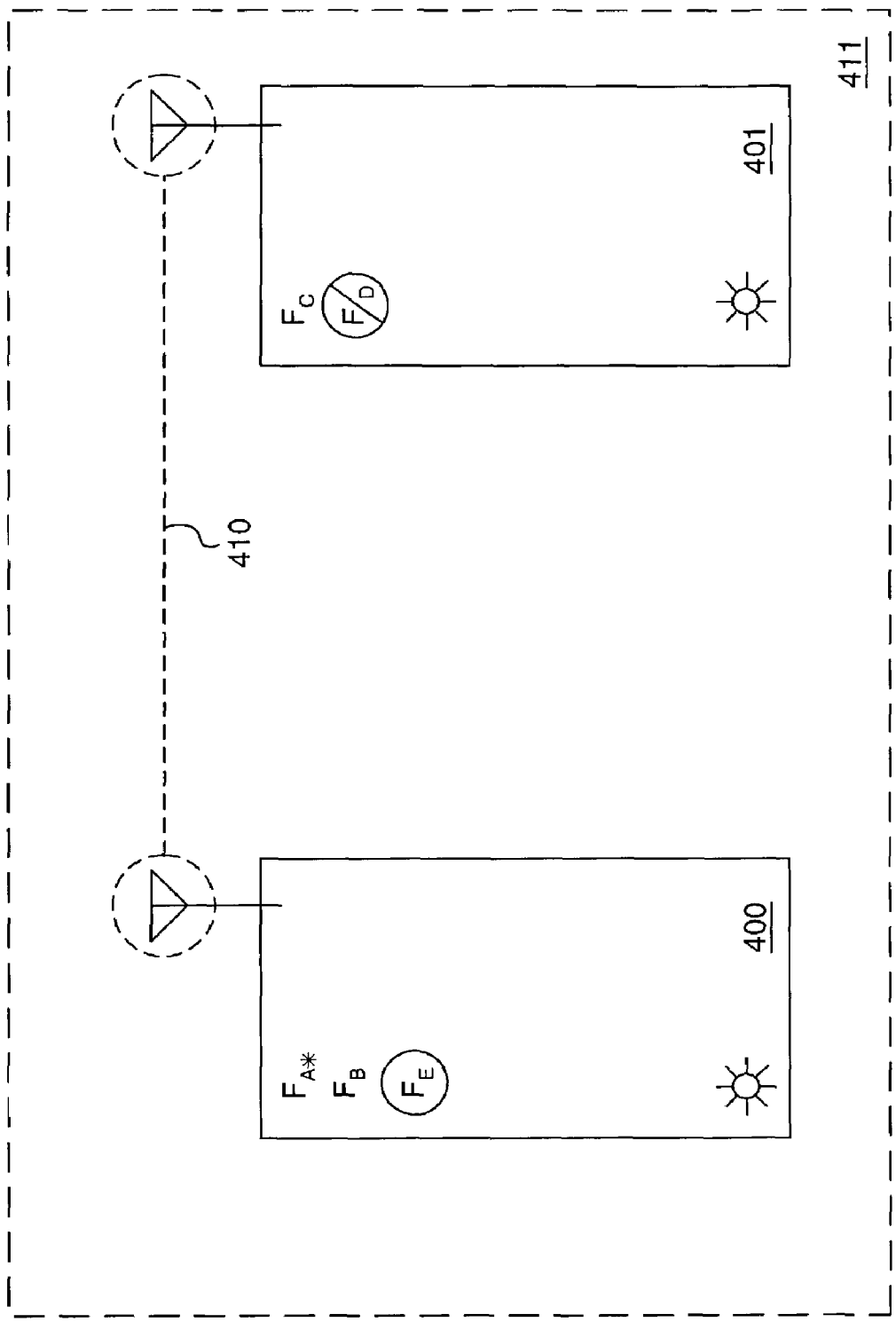

FIG. 4B shows the identical two wireless devices 400 and 401 in close enough proximity to become in-contact via wireless connection 410. This results in an active-collaborative-collection 411 of the two wireless devices, shown by the lit indicators in the lower left-hand corners of the two devices and the dashed box. The two wireless devices are aware that they are now active-members of this active-collaborative-collection and alter functionality accordingly. Therefore as part of the active-collaborative-collection wireless device 400 has a new function $F_E$ (shown in a circle) and device 400 alters function $F_A$ to modified form $F_{A*}$. Similarly wireless device 401 no longer has function $F_D$ (shown in a crossed-out circle) while wireless device 401 is part of the active-collaborative-collection.

When devices 400 and 401 are no longer in-contact (by way of physical movement with respect to each other or changes in communication conditions between them, for example), the situation reverts to that shown in FIG. 4A. The devices monitor the in-contact status and are aware that they are no longer active-members in the collaborative-collection and alter functionality accordingly, restoring the original functionality. Thus device 400 removes new function $F_E$ and restores function $F_A$ to the previous form, while device 401 restores previous function $F_D$.

Wireless systems built according to the present invention are not limited to two devices, but may contain an arbitrary number. A system of three such wireless devices built in accordance with the present invention is shown in the third illustrative embodiment of FIG. 4C and FIG. 4D.

Figure 4C:
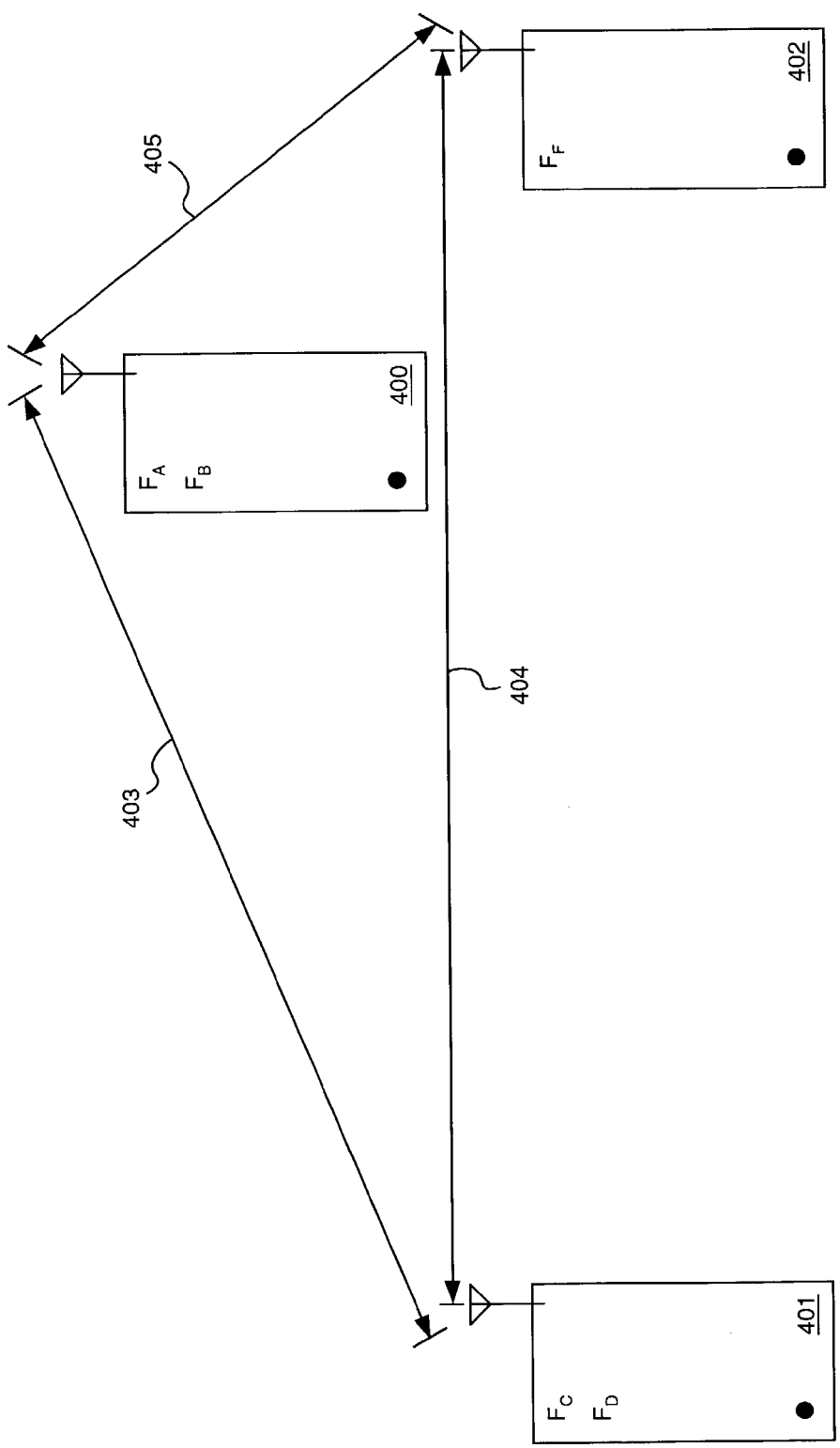
FIGS. 4C and 4D illustrate three wireless devices capable of participating in a collaborative-collection of wireless devices, in accordance with a third illustrative embodiment of the present invention.

FIG. 4C shows three wireless devices 400, 401, and 402, each according to the present invention, enabled to detect and communicate with each other but separated such that communication and hence proximity detection and identification are not possible. Device 400 is separated from device 401 by distance 403. Device 401 is separated from device 402 by distance 404. Device 402 is separated from device 400 by distance 405. All of the three distances 403, 404, and 405 are beyond the communication range of the devices under the given set of conditions. Thus the devices are not in-contact, and are not active-members of an active-collaborative-collection, as shown by the extinguished indicators appearing in the lower left-hand corners of the three devices. In this state wireless device 400 has two functions $F_A$ and $F_B$, wireless device 401 has two functions $F_C$ and $F_D$, while wireless device 402 has a single function $F_F$.

Figure 4D:
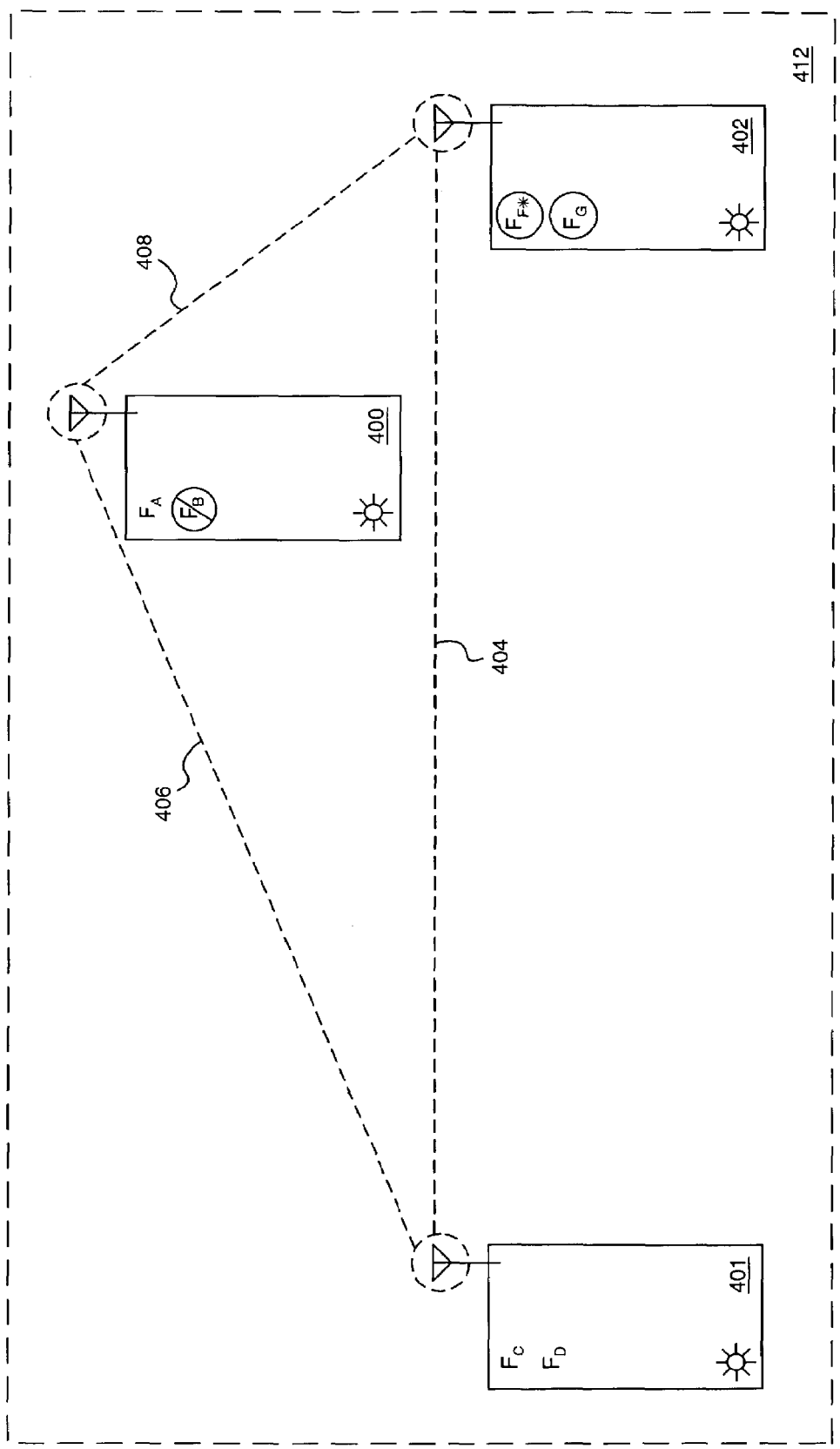

FIG. 4D shows the same three wireless devices 400, 401, and 402 of FIG. 4C in close enough proximity to become in-contact with each other. Device 400 and device 401 communicate via wireless connection 406. Device 401 and device 402 communicate via wireless connection 407. Device 402 and device 400 communicate via wireless connection 408. These communication links establish an active-collaborative-collection of the three wireless devices, as shown by the lit indicators in the lower left-hand corners of the three devices and the dashed box. The three wireless devices are aware that they are now active-members of this active-collaborative-collection 412 and alter functionality accordingly. Therefore while part of the active-collaborative-collection wireless device 400 removes function $F_B$ (shown in a crossed-out circle), wireless device 401 leaves functions $F_C$ and $F_D$ unchanged, and wireless device 402 modifies function $F_F$ to $F_{F*}$ and adds a new function $F_G$ (shown in a circle). Devices 400, 401, and 402 monitor in-contact status and when they are no longer in-contact the situation reverts to that of FIG. 4C, and the functionality of each device changes accordingly.

Figure 4E:
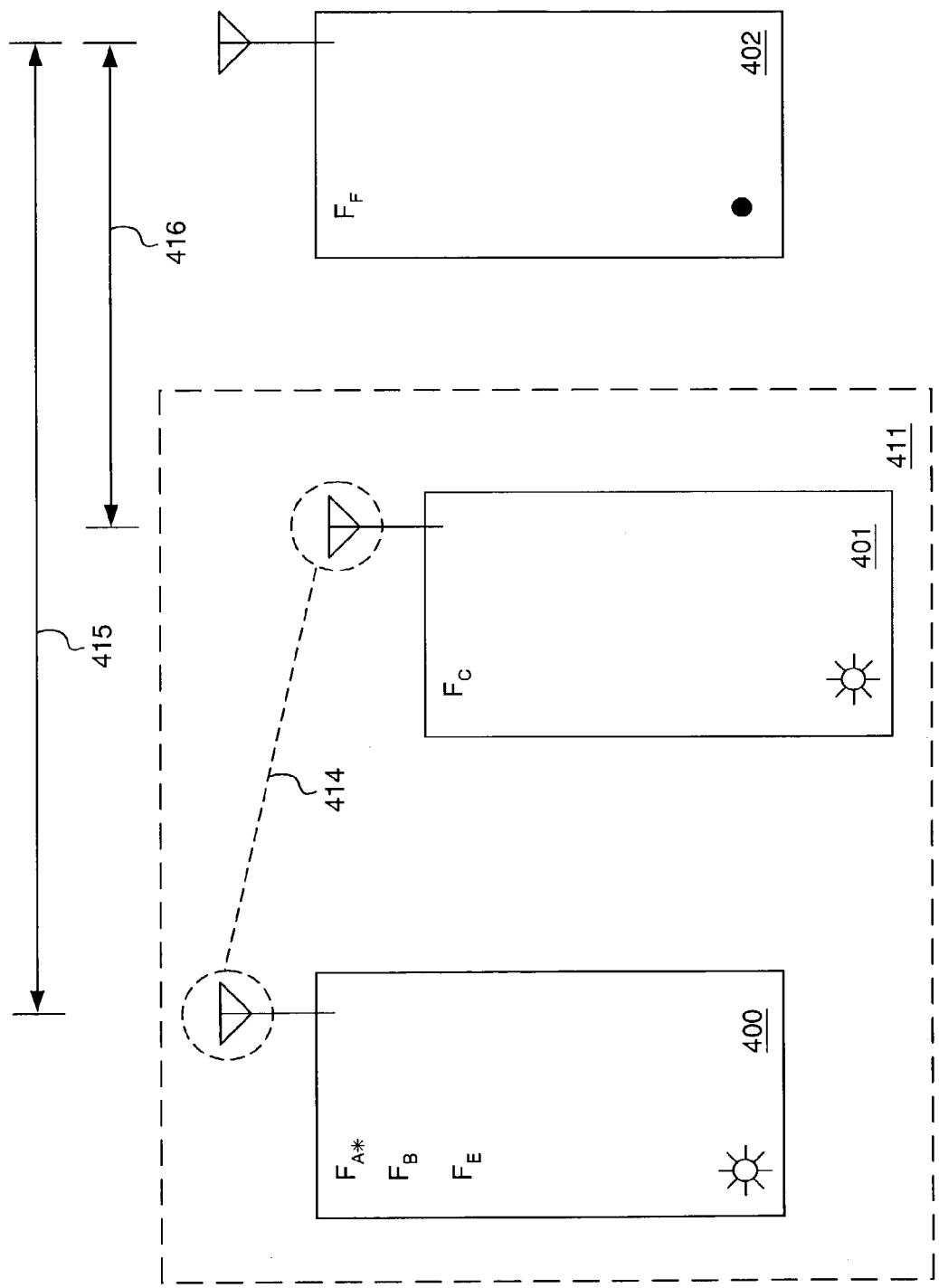
FIGS. 4E and 4F illustrate three wireless devices capable of participating in a collaborative-collection of wireless devices, in accordance with a fourth illustrative embodiment of the present invention.
Figure 4F:
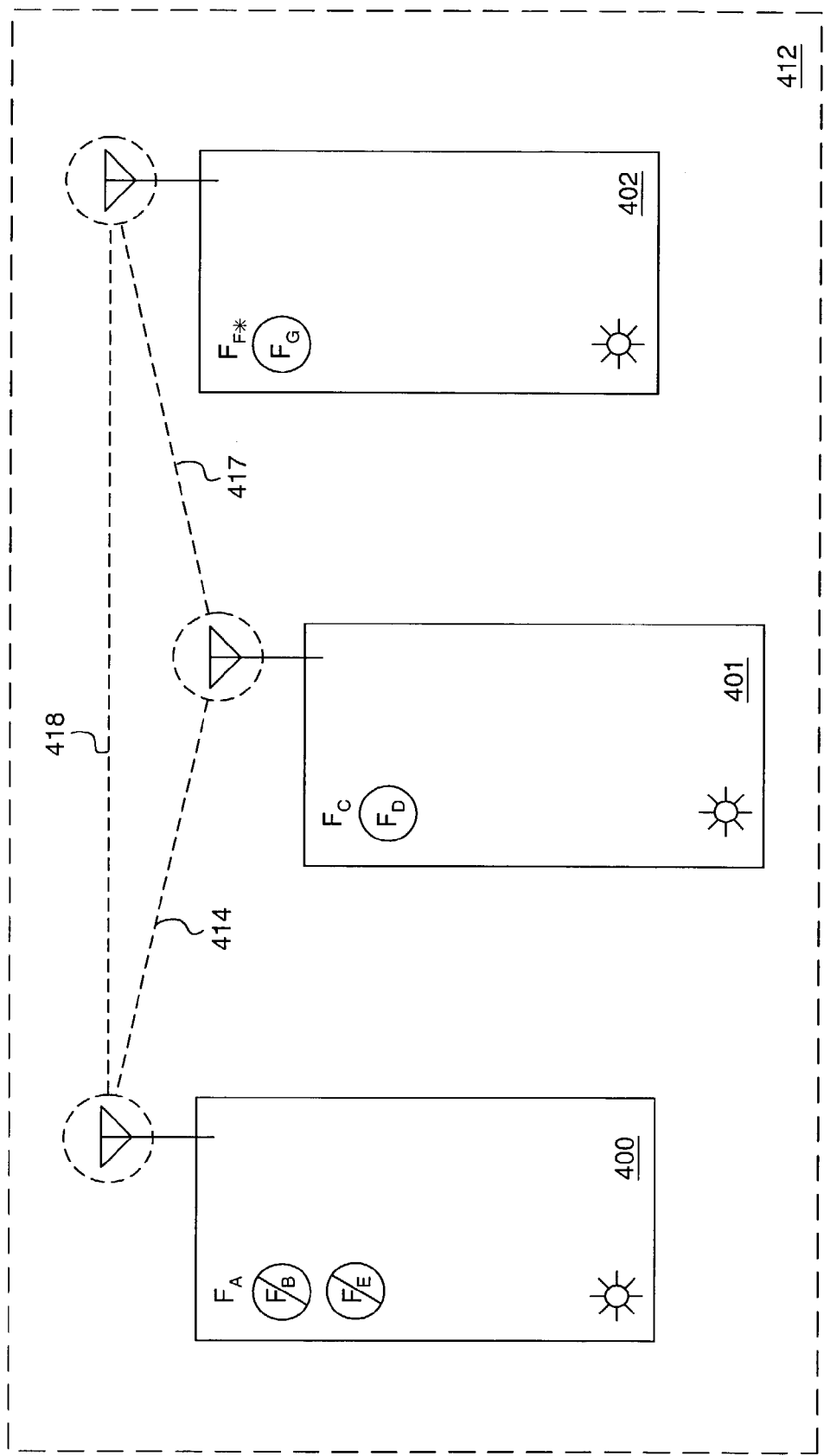

It may also be that an additional device joins an existing active-collaborative-collection, as shown in the fourth illustrative embodiment of FIG. 4E and FIG. 4F. FIG. 4E shows the same three wireless devices 400, 401, and 402, where devices 400 and 401 are in-contact via wireless connection 414 forming active-collaborative-collection 411 (shown by the dashed box and the lit indicators). Note that this active-collaborative-collection is identical to that shown in FIG. 1B, since the active-collaborative-collection is defined by the devices in-contact and not by the specific communication mechanism. Device 402 is not in-contact with either device 400 or 401 as distances 415 and 416, respectively, are too large for mutual communication. Thus device 402 is not an active member of the collaborative-collection (shown by the extinguished indicator). In this situation, device 400 has three functions $F_{A*}$, $F_B$, and $F_E$. Device 401 has a single function $F_C$. Device 402 has a single function $F_F$.

Conditions change such that device 402 becomes in-contact with devices 400 and 401, via wireless connections 418 and 417, respectively, shown in FIG. 4F. The active-collaborative-collection 412 (shown by the dashed box and the lit indicators) is identical to the one of FIG. 4D. In this situation, device 400 modifies function $F_{A*}$ to original function $F_A$, and removes functions $F_B$ and $F_E$ (shown by the crossed-out circles). Device 401 retains function $F_C$ and adds a new function $F_D$ (shown in a circle). Device 402 modifies function $F_F$ to $F_{F*}$, and adds a new function $F_G$.

Devices 400, 401, and 402 monitor in-contact status and if conditions change such that device 402 is no longer in-contact, then the situation reverts back to that depicted in FIG. 4E, and the functionality of each device changes accordingly.

As shown in FIG. 4A-F, the functions available in a wireless device in accordance with the present invention are a function of the active-membership (or lack thereof) of the device in an active-collaborative-collection. In addition, the functions available are also a function of what other devices are active-members of the active-collaborative-collection.

While the above illustrative scenarios are collaborative-collections with two or three devices, one of ordinary skill in the art will understand how to apply this approach to arbitrary numbers of devices forming dynamic active-collaborative-collections of varying numbers of devices. Similarly, while these illustrations of the present invention are based on closed-ended-collaborative-collections, extensions to open-ended-collaborative-collections are readily made.

One of ordinary skill in the art will also understand that proximity is relative to conditions and not merely a measure of distance. It may be manifested directly as effective signal strength between the two devices, which can be a function of distance between the devices, material separating the devices (a wall, for example), time of day, protocol in use, power saving state of the devices, protocol state of the devices, and so forth. These same variables may also affect proximity manifested indirectly as effective signal strength between a single wireless device and the local wireless access mechanism providing the logical connection to another wireless device.

Not withstanding the previous discussion generalizing the notion of proximity, one illustrative mechanism for local wireless communication, and hence the associated proximity detection, is the Bluetooth System. In this wireless communication implementation the mechanisms for proximity detection and device discovery are via an inquiry and a paging process. A second illustrative mechanism for local wireless communication and proximity detection is the 802.11 system. In this system mechanisms for proximity detection and device discovery are via scanning and joining processes. One of ordinary skill in the art will recognize that other local wireless access systems have equivalent mechanisms for proximity detection and device discovery.

One of ordinary skill in the art will also recognize that the figures and the associated text provided herein conceptually illustrate the physical topologies of generic systems. Accordingly, it will be appreciated that in the execution of a specific wireless standard, well-known configuration and provisioning activities must be performed as required by the specific wireless communication system being implemented. For example, in Bluetooth systems, wireless devices communicate only through a master device, while in 802.1 systems, wireless devices may communicate directly with each other ("independent" or ad-hoc), or through a distribution system ("infrastructure"). Thus more generally, each local wireless access system may provide for logical connectivity allowing apparent direct communication between any two or more devices via low-level software mechanisms. Thus, in each "active-collaboration" discussed herein, it will be further understood that the "connections" being referred to are not necessarily direct physical connections, but may be logical connections, as implementation circumstances dictate.

Figure 5A:
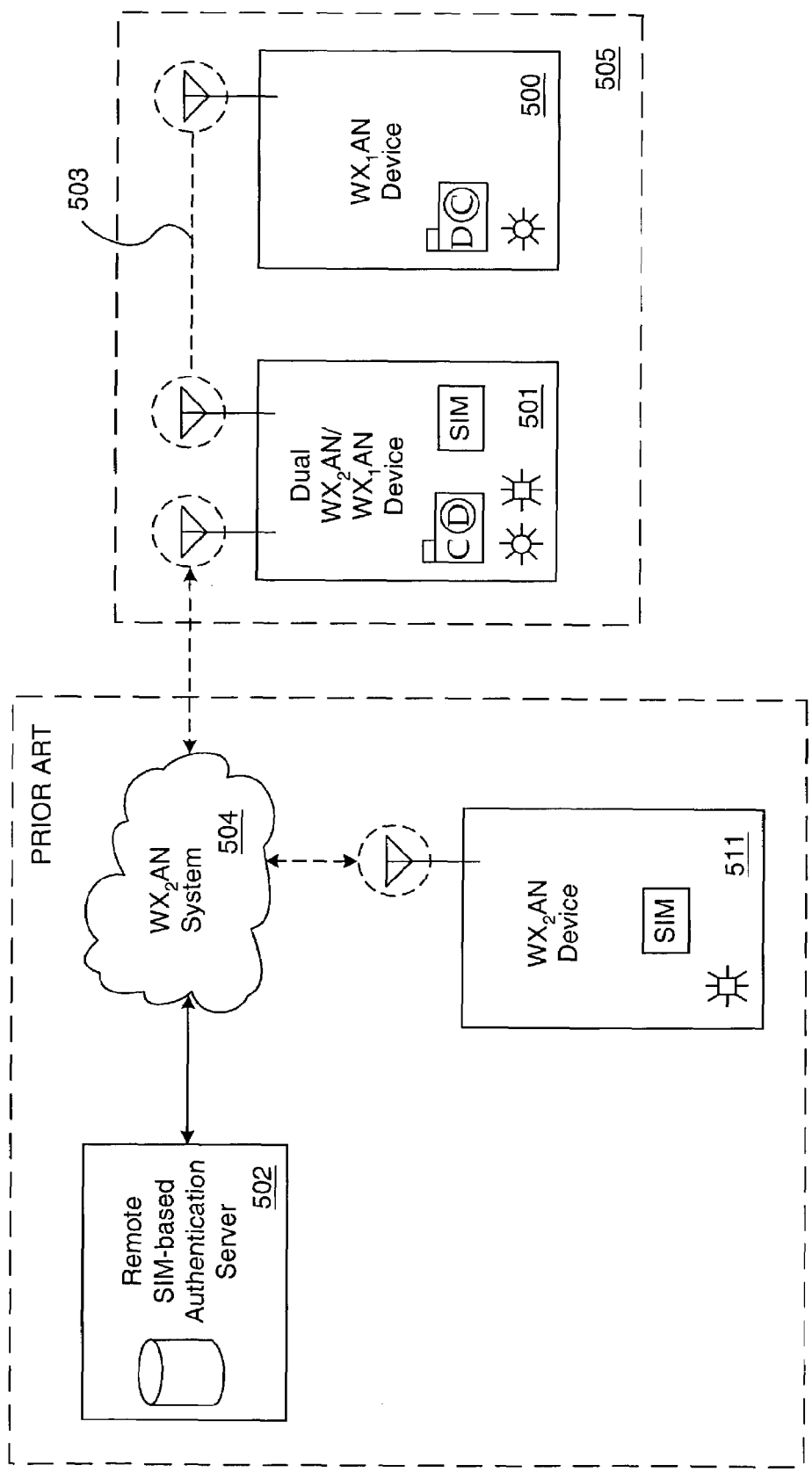
FIGS. 5A and 5B illustrate respective fifth and sixth embodiments, in accordance with the present invention, which combine collaborative-collection based authentication with SIM-based authentication.
Figure 5B:
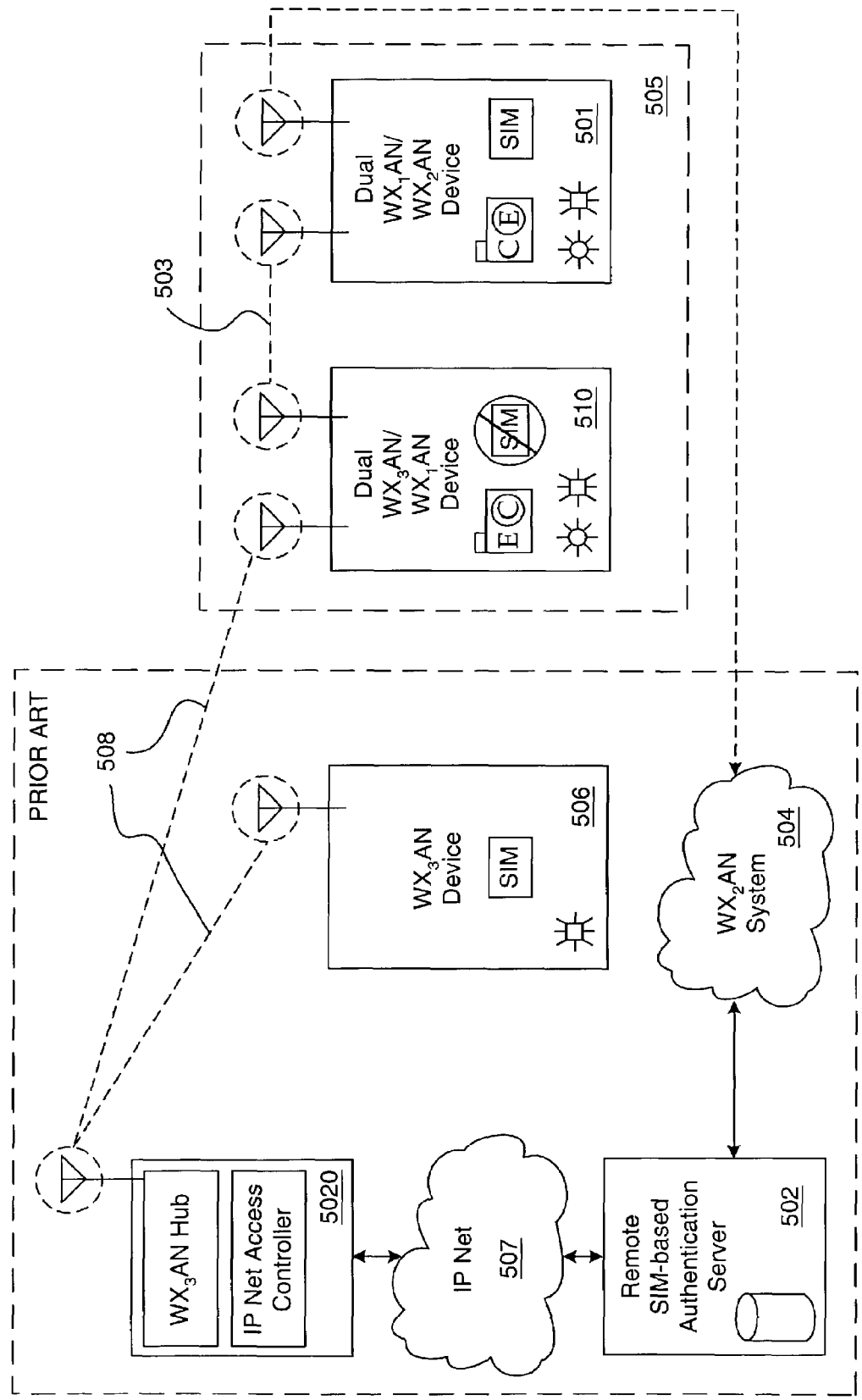

FIGS. 5A and 5B illustrate respective variations on combining collaborative-collection based authentication with SIM-based authentication. In accordance with a fifth illustrative embodiment of the present invention, FIG. 5A illustrates how association-based policies of a first device may depend upon the existence of a collaborative-collection with a SIM-authenticated second device (i.e., the second device is authenticated by a SIM-based authentication server). An active-collaborative-collection 505 of two wireless devices 500 and 501 includes a wireless connection 504 to a server 502. There are two wireless communication mechanisms: a local wireless access 503 between wireless devices 500 and 501 including the in-contact detection capability, and a wide area wireless access mechanism 504 between wireless device 501 and server 502. Only wireless device 501 is able to communicate directly to server 502.

Wireless device 501 is shown with a SIM present and is further shown as being "SIM-authenticated," i.e., authenticated by a SIM-based authentication server, in this case server 502. Wireless devices 500 and 501 are active members of a collaborative-collection as suggested by the twin lit active-member of collaborative-collection indicators. Furthermore, the two wireless devices 500 and 501 have exchanged authentication state as indicated by their respective file folders containing complementary authentication data.

In an illustrative embodiment, at least some of the association-based policies of wireless device 500 are a function of whether or not wireless device 501 has been SIM-authenticated. Consider a scenario where device 501 is a mobile phone, device 500 is a computer (such as a desktop PC, a laptop, or a PDA), and wireless access 503 uses Bluetooth. The association-based policies for device 500 include security-access policies. At least some of the security-access policies require that wireless device 501 be SIM-authenticated before certain resources are user accessible. This scenario is of particular usefulness when the computer and mobile phone "belong" to the same user and further that the user generally wears (or otherwise carries about) the mobile-phone. A first illustrative security-access policy based on this scenario is to modify the logon dialog procedure such that a "locked" computer will be unlocked only by a logon password simultaneous with the existence of a collaborative-collection with a specific wireless device that is SIM-authenticated.

A second illustrative security-access policy based on the above scenario is to prevent lockout due to inactivity, provided there is a collaborative collection with a specific wireless device that is SIM-authenticated. This could be implemented in a number of different ways. One approach would be to equate the existence of a collaborative collection with a specific wireless device that is SIM-authenticated as a form of "activity" that keeps the inactivity timer reset. This is a somewhat simplified approach as more generally there are multiple inactivity countdowns. For example, a first inactivity countdown timer may initiate power-down staging, while a second inactivity countdown timer may initiate lockout. Thus a more sophisticated approach would be permit power-down staging, but alter the lock-out function such that to enter the lock-out state both the lock-out countdown reaches zero and there is a loss of membership in the collaborative collection with a specific wireless device that is SIM-authenticated.

FIG. 5B illustrates how a collaborative-collection may permit a device without a SIM to become SIM-authenticated. The portion of FIG. 5B labeled "prior art" was previously described in the background section above. In accordance with a sixth illustrative embodiment of the present invention, wireless device 510 (such as a laptop) is authenticated by the Net Access Controller with the WLAN-Hub and Gateway 5020, even though it does not physically have a SIM. It is able to do so because there is a collaborative-collection that includes wireless device 501 (such as a mobile-phone), which does have a SIM.

Wireless access 503 thus permits wireless device 510 to act as a transparent intermediary between the Net Access Controller and wireless device 501 during the authentication process. Wireless device 510 spoofs the Net Access Controller, interacting with it in a manner that is indistinguishable from the Net Access Controller's interactions with prior art wireless device 560. In reality, the IMSI and SRES that wireless device 510 provides to the Net Access Controller originate with the SIM held within wireless device 501. A key advantage of this approach is that the user need not physically move their SIM from their mobile phone to their laptop. It is therefore more convenient, reduces the time to establish an authenticated-connection to the IP network, and eliminates unnecessary handling of the SIM.

Wireless devices in accordance with the fifth and sixth embodiments of the present invention can thus monitor in-contact status, form active-collaborative-collections of wireless devices, and exploit the SIM authentication resources of other wireless devices in the collection to affect their own device functions. One of ordinary skill in the art will recognize that these concepts may be extended to cover an arbitrary number of wireless devices, fixed and mobile, each with arbitrary numbers of association-based policies, along with any number of authentication servers in any combination.

Time-of-Membership Affects Device Functions

The second area of the present invention involves a first wireless device, monitoring and recording times-of-membership and times-of-non-membership of any number of wireless devices (including said first wireless device) with respect to any number of collaborative-collections said first device itself is part of, and said first device modifying its own functionality based on this information, in accordance with the present invention. Such modified functionality may include security policies. In the notebook and wireless-enabled-desk illustrative scenario previously described, this could mean that the notebook requires the password if the notebook, with respect to a collaborative-collection including the desk, has a time-of-non-membership greater than a certain amount of time. Similarly, in the case of the phone and the PDA, the PDA might require a password even when it is currently an active-member in an active-collaborative-collection if previously the time-of-non-membership of the PDA with respect to the collaborative-collection including the phone was greater than a certain amount of time.

Figure 6:
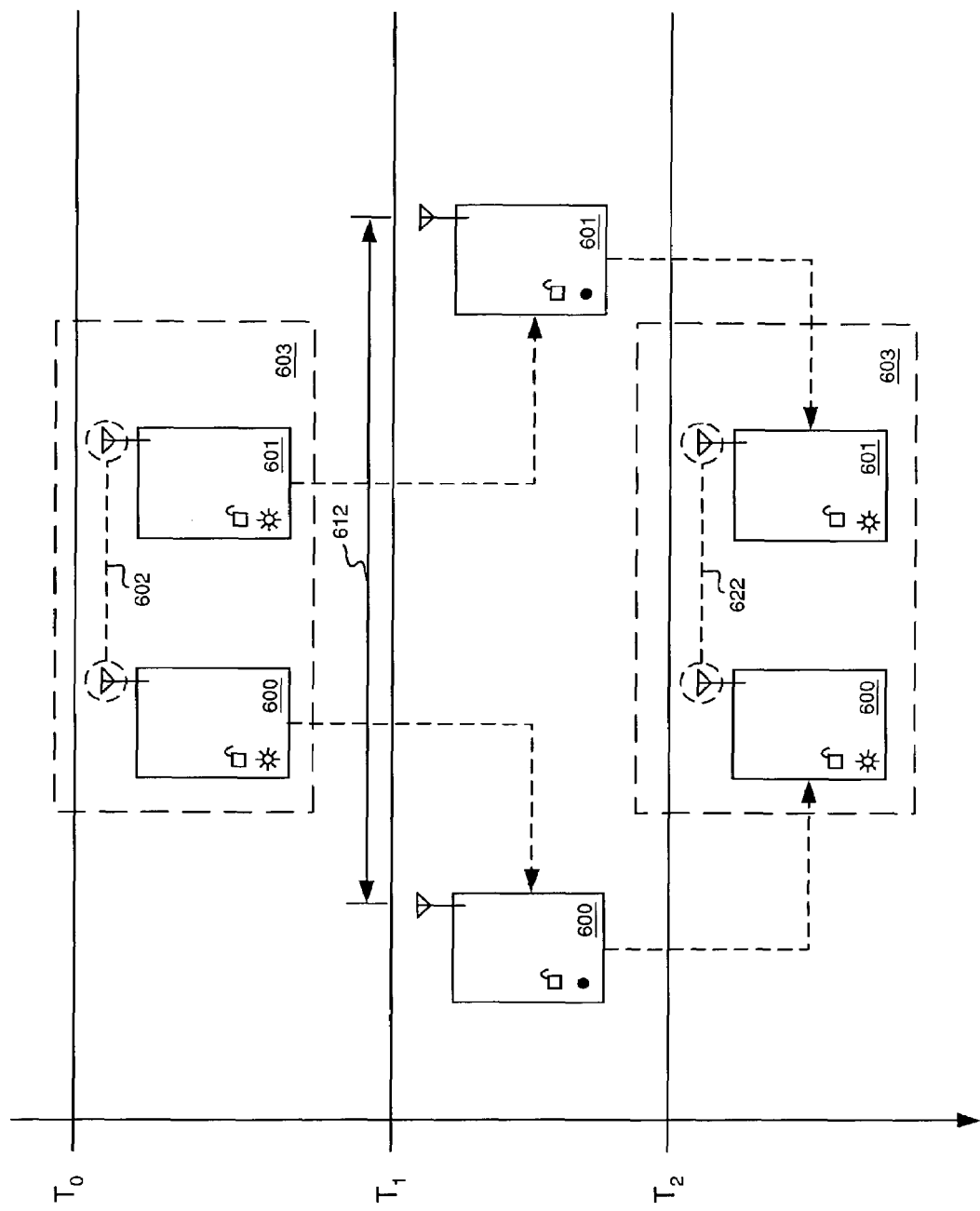
FIG. 6 shows the time sequence behavior of two wireless devices, where the devices begin as an active-collaborative-collection, reach a state where they are not in-contact with each other, thus rendering the collective-collaboration inactive, and again return to a state where the active-collaborative-collection is reformed, in accordance with an illustrative seventh embodiment of the present invention.
Figure 7A:
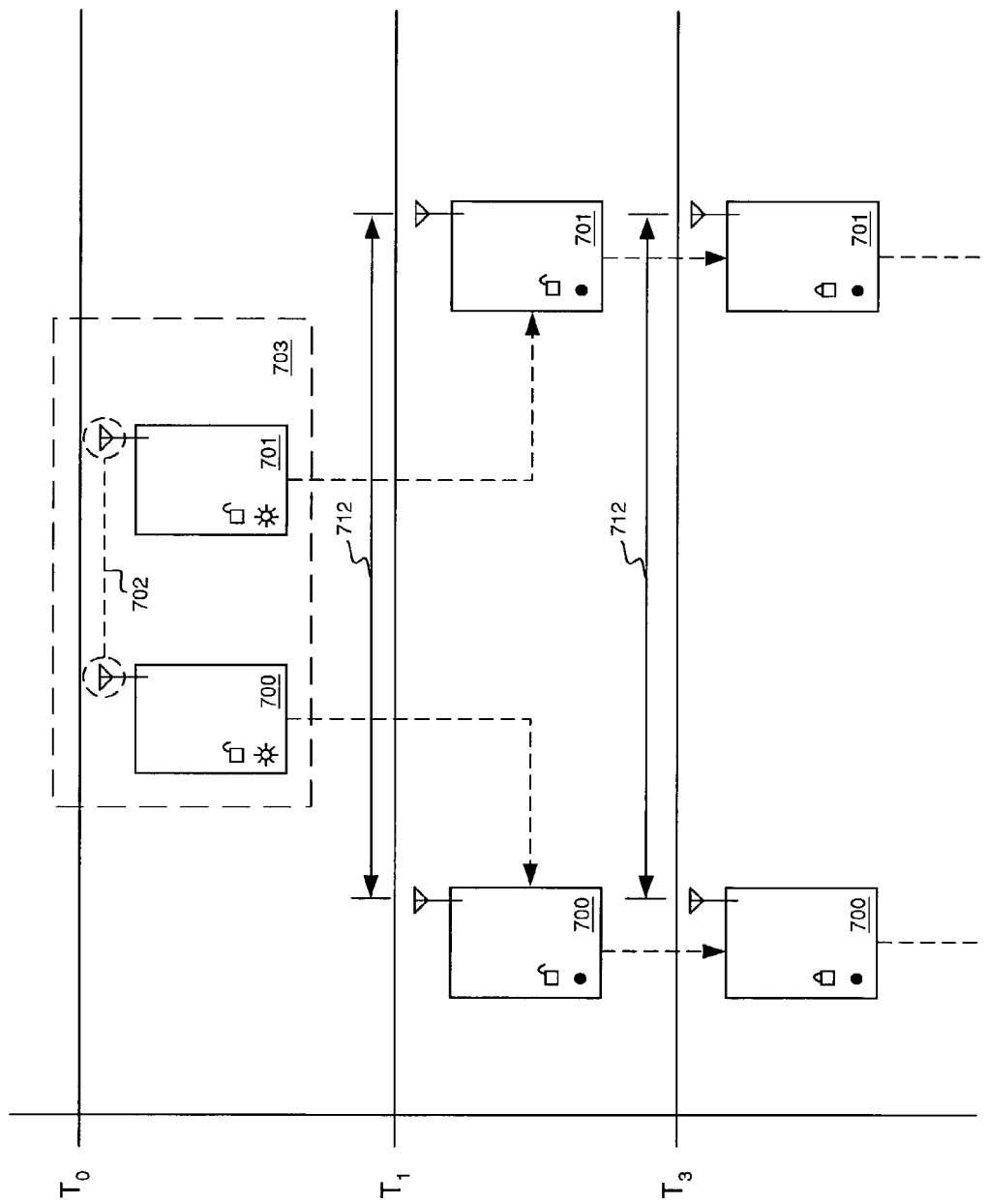
FIGS. 7A and 7B show the time sequence behavior of two wireless devices, where the devices begin as an active-collaborative-collection, reach a state where they are not in-contact with each other, remain in this state beyond a threshold time, return to a state where the active-collaborative-collection is reformed, but remain in a no-privilege state until user authentication is provided, in accordance with an illustrative eighth embodiment of the present invention.
Figure 7B:
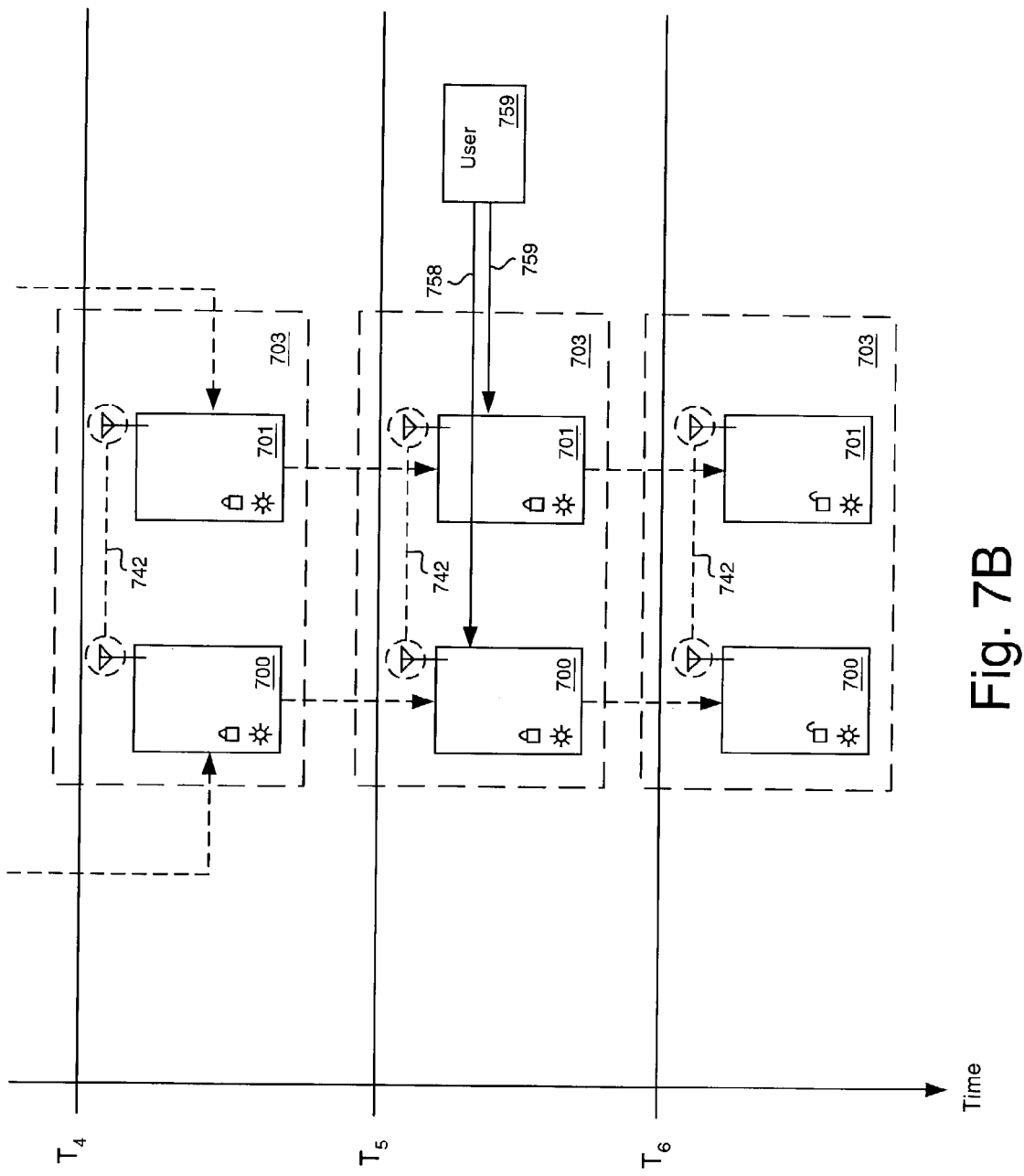

This is depicted in two timelines shown in FIG. 6 and FIGS. 7A and 7B. Conceptually, the seventh illustrative embodiment of FIG. 6 shows the time behavior of two wireless devices, as they are first active-members of an active-collaborative-collection, then inactive-members of the same collaborative-collection, and finally again become active-members of the active-collaborative-collection, in accordance with the present invention. The times-of-non-membership of each device, with respect to the collaborative-collection they form, are less than some threshold values. As a consequence, the devices remain fully privileged during this period. On the other hand, the eighth illustrative embodiment of FIGS. 7A and 7B shows the time behavior when two wireless devices, first are active-members of an active-collaborative-collection, then inactive-members of the same collaborative-collection and remain inactive-members of the same collaborative-collection for a time greater than a threshold time, in accordance with the present invention. The times-of-non-membership of each device, with respect to the collaborative-collection they form, have each exceeded a threshold value, and as a consequence the devices revert to the non-privilege state, requiring authentication to return to the full-privilege state. These two situations are described in more detail below.

Shown in FIG. 6 is a time sequence of a system of two wireless devices, capable of forming a collaborative-collection when the two devices are in-contact, as previously described in accordance with the present invention. There are three time instances shown in increasing order: $T_0$, $T_1$, and $T_2$.

At first time $T_0$, wireless devices 600 and 601 are in-contact, forming an active-collaborative-collection 603 (shown by the dashed box and the lit indicators) via wireless connection 602. The two devices are fully privileged (signified by the unlocked padlocks). The two devices remain in-contact, sustaining communication via wireless connection 602, up until later time $T_1$. At this later time $T_1$, the two wireless devices 600 and 601 are no longer in-contact, as distance 612 is greater than the maximum communication distance between these two wireless devices under the given set of conditions. In other words, from time $T_0$ to just before $T_1$ the two devices form the active-collaborative-collection 603. At time $T_1$ the collaborative-collection becomes inactive since devices 600 and 601 are no longer in-contact and therefore no longer active-members in the collaborative-collection. The extinguished indicators show this. The two devices 600 and 601 remain fully privileged, as shown by the unlocked padlocks.

At later time $T_2$, the two devices are again in-contact, and become active-members of and form again active-collaborative-collection 603 (shown by the dashed box and the lit indicators), via wireless connection 622. Note that wireless connection 622 at time $T_2$ has no specific relationship to wireless connection 602 at time $T_0$, other than both connections 602 and 622 serve to connect devices 600 and 601. As shown by the unlocked padlocks, devices 600 and 601 remain fully privileged at time $T_2$.

In the situation shown by FIG. 6 the two wireless devices are fully-privileged during the entire time from $T_0$ to $T_2$, even though they are not in-contact for a portion of the time. This is because the time-of-non-membership ($T_2$-$T_1$) of device 600 with respect to the collaborative-collection of devices 600 and 601 is less than a specific threshold value, and similarly for device 601 with respect to the same collaborative-collection. The operation when the time-of-non-membership is greater than a threshold value is shown next in FIGS. 7A and 7B.

Shown in FIGS. 7A and 7B is a time sequence of a system of two wireless devices, capable of forming an active-collaborative-collection when the two devices are in-contact, as previously described, in accordance with the present invention. There are six time instances shown in increasing order: $T_0$, $T_1$, $T_3$, $T_4$, $T_5$, and $T_6$.

At first time $T_0$, wireless devices 700 and 701 are in-contact, forming an active-collaborative-collection 703 (shown by the dashed box and the lit indicators) via wireless connection 702. The two devices are fully privileged (signified by the unlocked padlocks). The two devices remain in-contact, sustaining communication via wireless connection 702, up until later time $T_1$. At this later time $T_1$, the two wireless devices 700 and 701 are no longer in-contact, as distance 712 is greater than the maximum communication distance between these two wireless devices under the given set of conditions. In other words, from time $T_0$ to just before time $T_1$ the two devices form the active-collaborative-collection 703. At time $T_1$, the collaborative-collection becomes inactive since devices 700 and 701 are no longer in-contact and therefore no longer active-members in the collaborative-collection. The extinguished indicators show this. The two devices 700 and 701 remain fully privileged, as shown by the unlocked padlocks.

At later time $T_3$, the times-of-non-membership of devices 700 and 701, with respect to the collaborative-collection of these two devices, have each exceeded a threshold, and as a consequence the two devices are no longer in the full-privilege state but are instead in the no-privilege state, as shown by the locked padlocks at time $T_3$. The two wireless devices monitor and act upon the times-of-non-membership, detecting when the value ($T_3$-$T_1$) is greater than the threshold. When this is recognized, the two devices switch to the no-privilege state. The two devices 700 and 701 must perform this function independently of each other, as they are not in communication at the time of detection.

At later time $T_4$, the two devices are again in-contact, via wireless connection 742, becoming active-members in active-collaborative-collection 703 (shown by the dashed box and lit indicators). In other words, the time-of-non-membership of devices 700 and 701, with respect to the collaborative-collection formed from the two devices, is from time $T_1$ until just before time $T_4$. However, even though devices 700 and 701 are once again active-members in the collaborative-collection 703, the two devices remain in the no-privilege state, and continue to remain in this state until the authentication event occurring at later time $T_5$.

At later time $T_5$, user 759 provides authentication information 758 to device 700 and authentication information 757 to device 701. Authentication is complete at later time $T_6$, when devices 700 and 701 return to the full-privilege state (as shown by the unlocked padlocks).

Thus devices 700 and 701 monitor the time-of-non-membership with respect to the collaborative-collection of the two devices. From the point of view of either one of these two devices, while the time-of-non-membership is below a threshold value (from time $T_1$ up until just before time $T_3$) the device remains in the full-privilege state. After the time-of-non-membership is greater than or equal to a threshold value (at time $T_3$), the device reverts to the no-privilege state, and remains in this state until a user has provided authentication information. Thus it is of no consequence, with respect to the full or no privilege state of the given device, when the device again becomes an active-member of the active-collaborative-collection 703 at time $T_4$. It is the authentication event at time $T_5$ that enables the full-privilege state in the device.

Figure 8A:
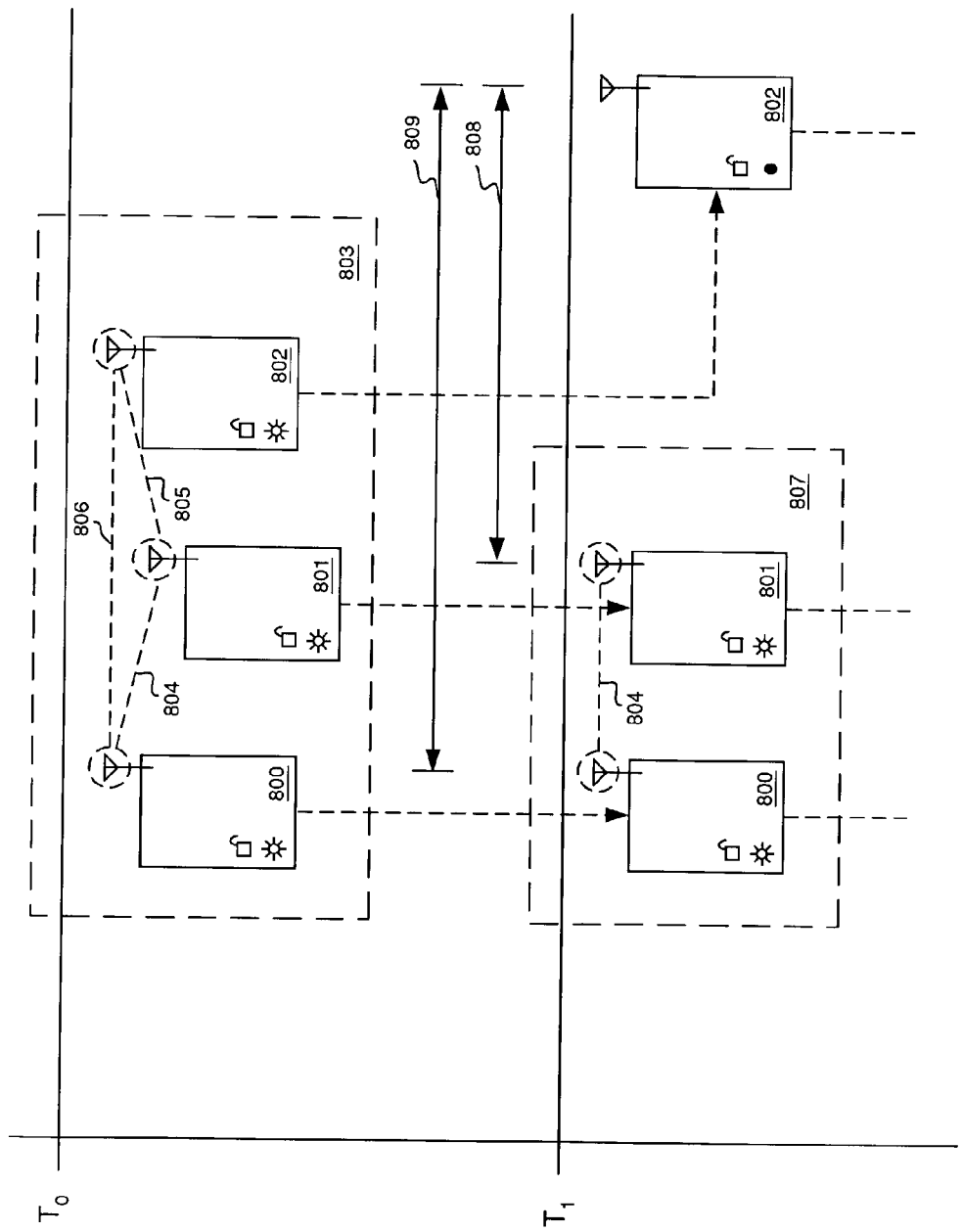
FIGS. 8A and 8B show the time sequence behavior of three wireless devices, where the devices begin as an active-collaborative-collection, reach a state where one of them is not in-contact with the others, remain in this state beyond a threshold time, return to a state where the original active-collaborative-collection of the three devices is reformed, but remain in a no-privilege state until user authentication is provided, in accordance with an illustrative ninth embodiment of the present invention.
Figure 8B:
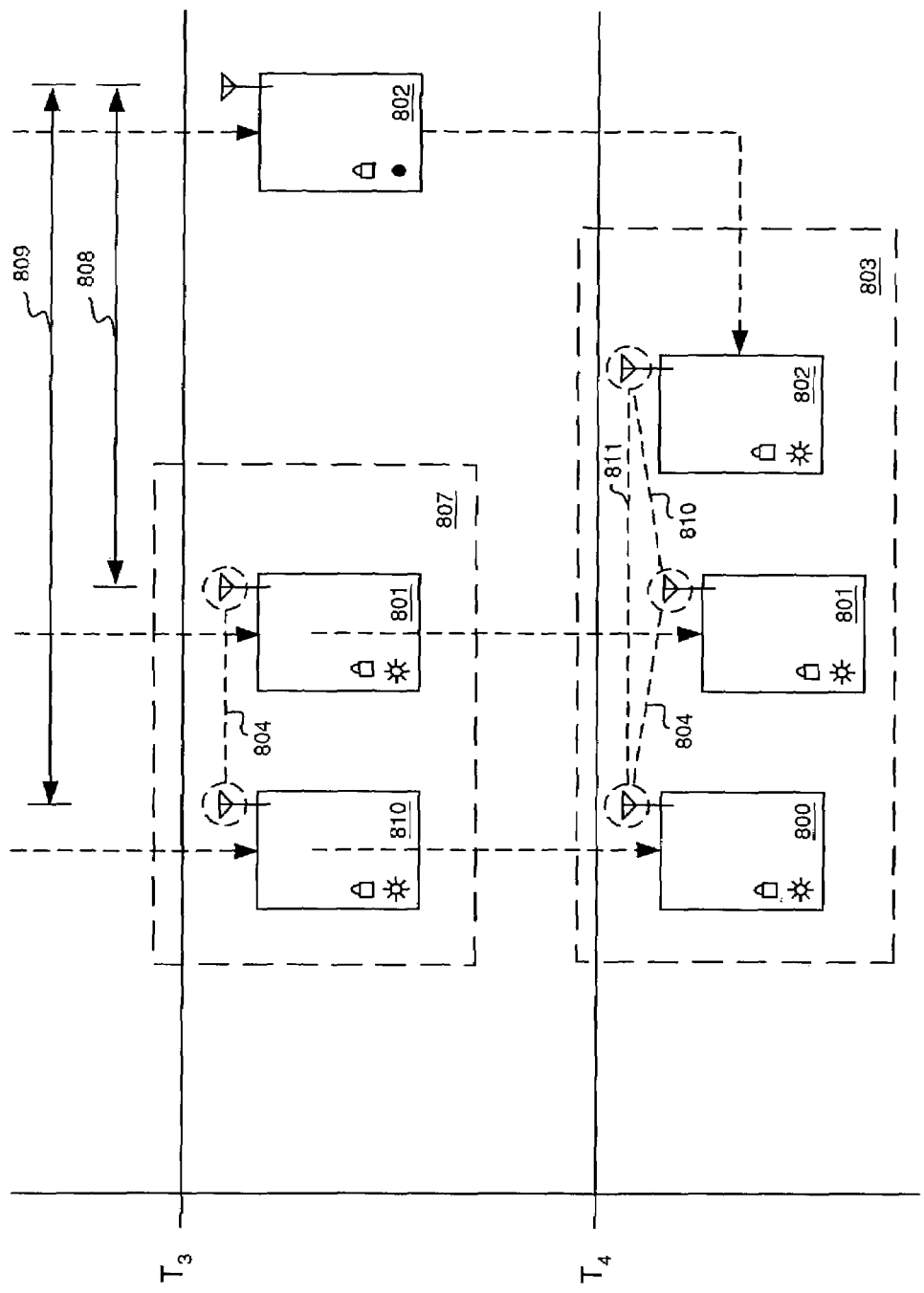

Shown in the ninth illustrative embodiment of FIGS. 8A and 8B is a similar time sequence but with three wireless devices, in accordance with the present invention, capable of forming active-collaborative-collections of two or three devices. There are four time instances shown in increasing order: $T_0$, $T_1$, $T_3$, and $T_4$.

At first time $T_0$, wireless devices 800, 801, and 802 are in-contact, forming an active-collaborative-collection 803 (shown by the dashed box and the lit indicators) via wireless connections 804, 805, and 806. The three devices are fully privileged (signified by the unlocked padlocks). The three devices remain in-contact up until later time $T_1$. At this later time $T_1$, wireless device 802 is no longer in-contact, as distances 809 and 808 to devices 800 and 801, respectively, are greater than the maximum communication distance between the corresponding wireless devices under the given set of conditions. In other words, from time $T_0$ to just before time $T_1$ the three devices 800, 801, and 802 form the active-collaborative-collection 803. At time $T_1$, the active-collaborative-collection no longer includes device 802, and a new active-collaborative-collection 807 of the two devices 800 and 801 is formed (shown by the dashed box and the lit indicators in devices 800 and 801, and the extinguished indicator in device 802). All three devices 800, 801, and 802 remain fully privileged, as shown by the unlocked padlocks.

At later time $T_3$, the time-of-non-membership of device 802, as measured by devices 800 and 801, exceeds a certain threshold, and as a consequence devices 800 and 801 revert to the no-privilege state, even though devices 800 and 801 remain active-members in the active-collaborative-collection 807 they form. The locked padlocks show the no-privilege state. Similarly, device 802 measures its own time-of-non-membership with respect to devices 800 and 801, and also determines, at time $T_3$, that this time-of-non-membership exceeds a threshold, and as a consequence device 802 also reverts to the no-privilege state, as shown by the locked padlock. Thus the three wireless devices monitor and act upon the determined times-of-non-membership, detecting when the value $(T_3-T_1)$ is greater than the threshold. When this is recognized, the devices switch to the no-privilege state. Device 802 must perform this function independently of devices 800 and 801, since it is not in communication with these two devices at the time of detection.

At later time $T_4$, all three devices 800, 801, and 802 are again in-contact, via wireless connections 804, 810, and 811, again forming a single active-collaborative-collection 803 (shown by the dashed box and lit indicators). In other words, the time-of-non-membership of device 802 with respect to the active-collaborative-collection formed with active-member devices 800 and 801, is from time $T_1$ until just before time $T_4$. However, even though all three devices 800, 801, and 802 are once again active-members in a single collaborative-collection 803, the three devices remain in the no-privilege state, and continue to remain in this state until an authentication event occurring at some later time (not shown).

Thus each of the devices 800, 801, and 802 monitor the time-of-non-membership of all devices in the collaborative-collection of the three devices. From the point of view of either device 800 or 801, while the time-of-non-membership of device 802 is below a threshold value (from time $T_1$ up until just before time $T_3$) device 800 or 801, respectively, remains in the full-privilege state. After the time-of-non-membership of device 802 is greater than or equal to a threshold value (at time $T_3$), device 800 or 801 reverts to the no-privilege state, and remains in this state until a user has provided authentication information. Similarly, from the point of view of device 802, while the time-of-non-membership of itself with respect to devices 800 and 801 is below a threshold value (from time $T_1$ up until just before time $T_3$) device 802 remains in the full-privilege state. When the time equals or exceeds this threshold device 802 reverts to the no-privilege state, remaining in this state until a user has provided authentication information. It is not required that all three devices use an identical threshold value. Device 800 may revert to a no-privilege state at a time greater than or less than device 801. Similarly, device 802 may revert to a no-privilege state at a first time threshold with respect to device 800 and a different second time threshold with respect to device 801.

Thus it is shown that times-of-membership may be monitored for multiple devices and functionality changed according to the times-of-membership and times-of-non-membership of any of the devices in the collaborative-collection. One of ordinary skill in the art will recognize that the operation of monitoring the times-of-membership and times-of-non-membership of wireless devices in a collaborative-collection and then modifying available functionality in a device is extendable to multiple time periods of communication and lack of communication, multiple time thresholds for different behavior changes, and open or closed-collaborative-collections of an arbitrary number of two or more wireless devices. The time thresholds may themselves be time or authentication-state dependent, and the behaviors activated upon recognition of these time thresholds may also be time or authentication-state dependent. A log of times-of-membership and times-of-non-membership may be kept, and this history in total used to determine the changes in functionality, and so forth.

The above discussion described a drastic change in functional capability (full-privilege versus no-privilege) based on monitoring and tracking the times-of-membership and times-of-non-membership of a given wireless device with respect to a given collaborative-collection. However, more subtle changes in function may occur instead, and multiple changes in function may occur in different timeframes or with different collaborative-collections. For example, rather than transitioning directly to the no-privilege state, a device could undergo a graceful degradation as the time-of-non-membership increased. This would begin with full-privilege up until a first time threshold, and then proceed to a reduced privilege (with fewer capabilities than full-privilege but more capabilities than no-privilege) when the time-of-non-membership exceeded the first threshold. A further transition to no-privilege would occur when the time-of-non-membership exceeded a second threshold. A final transition to an even lower privilege state of complete user lock-out, where even authentication-state gathering is prohibited, could occur when the time-of-non-membership exceeded a third threshold.

In these various ways the functions of wireless devices, according to the present invention, are affected by the times-of-membership and times-of-non-membership of the various wireless devices in the collaborative-collection, thereby offering improved individual device functionality, security, or both.

Authentication-State of Collaborative-Collection of Devices Affects Device Functions The third area of the present invention uses the authentication-state of one or more active-members of an active-collaborative-collection to affect the function of one or more other active-members of the collaborative-collection. Given a collaborative-collection of devices, in accordance with the present invention, each of the devices may contain authentication-state. This authentication-state is made known to one or more other active-members in the active-collaborative-collection. The devices receiving this shared authentication-state alter functionality according to this additional authentication-state. This authentication-state sharing may encompass as little as a single pair of devices, where a first device supplies a subset of its own authentication-state to a second device but the second device supplies no information to the first. At the other extreme, this authentication-state sharing may involve all active-members in the active-collaborative-collection broadcasting their entire authentication-state to all other active-members in the active-collaborative-collection.

In an illustrative scenario of an active-collaborative-collection of a cell phone and a PDA, the phone may receive a message from a server indicating that the phone is stolen, and setting the phone into a no-privilege authentication-state. This authentication-state would be shared with the PDA and as a consequence the PDA would also enter a no-privilege authentication-state. Similarly, increased privilege may be conferred from one device in the active-collaborative-collection to another by sharing the authentication-state. The phone may communicate with a server to establish authentication for a privileged functionality, and then share this authentication-state with the PDA, enabling access to the privileged functionality in the PDA.

Figure 9A:
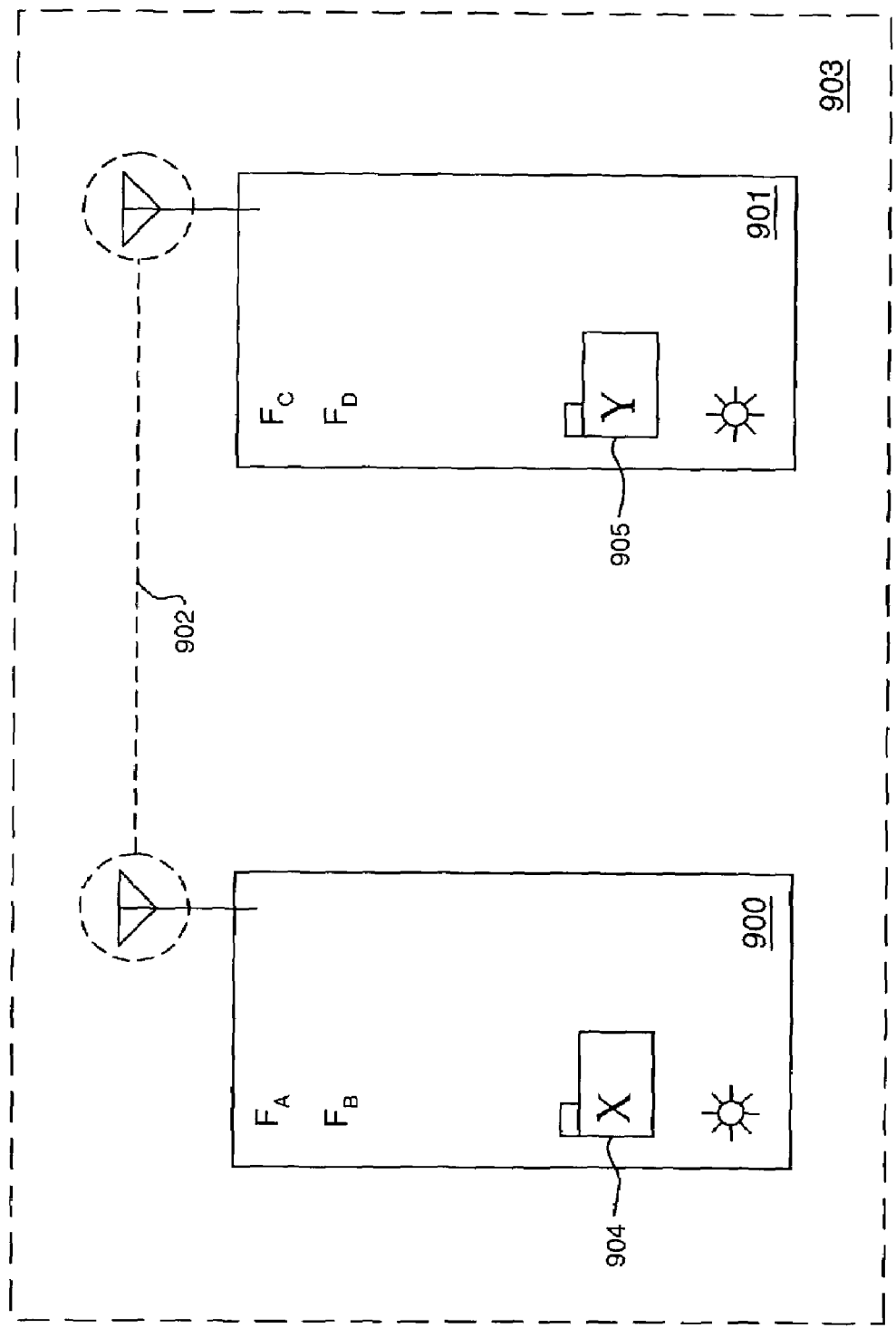
FIGS. 9A and 9B show an active-collaborative-collection of two wireless devices that are the subject of an authentication-state exchange in accordance with an illustrative tenth embodiment of the present invention.
Figure 9B:
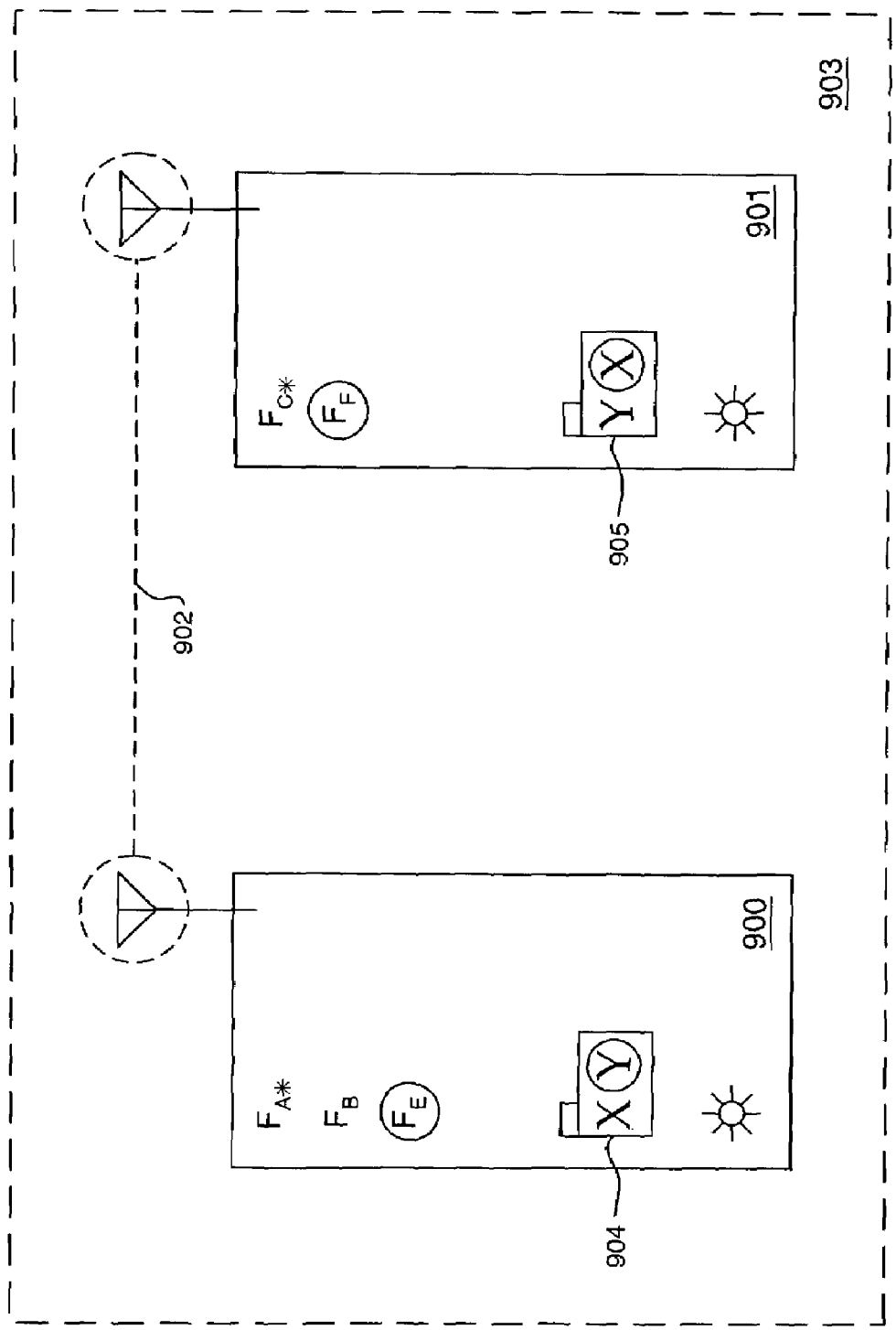

FIGS. 9A and 9B depict an active-collaborative-collection 903 of two wireless devices 900 and 901 (shown by the dashed box and the lit indicators), communicating via wireless connection 902, in accordance with a tenth illustrative embodiment of the present invention. In FIG. 9A, wireless device 900 contains authentication-state X held in authentication-state container 904. Correspondingly wireless device 901 contains authentication-state Y held in authentication-state container 905. While wireless device 900 contains authentication-state X and is an active-member in active-collaborative-collection 903 with wireless device 901, it has two functions $F_A$ and $F_B$. Similarly, while wireless device 901 contains authentication-state Y and is an active-member in active-collaborative-collection 903 with wireless device 900, it has two functions $F_C$ and $F_D$.

Devices 900 and 901 then exchange authentication-state and alter functionality accordingly. This is shown in FIG. 9B, where devices 900 and 901 continue to communication via connection 902, remaining as active-members in active-collaborative-collection 903 (shown by the dashed box and the lit indicators). Now device 900 authentication-state container 904 has authentication-state Y (shown in a circle), obtained from device 901 via connection 902, in addition to the previous authentication-state X. Similarly, device 901 authentication-state container 905 has authentication-state X (shown in a circle), obtained from device 900 via connection 902, in addition to the previous authentication-state Y.

Device 900 recognizes the new authentication-state Y in container 904 and modifies function $F_A$ to function $F_{A*}$ and adds a new function $F_E$ (shown in a circle). Similarly device 901 notices new authentication-state X in container 905 and modifies function $F_C$ to function $F_{C*}$ and adds a new function $F_F$ (shown in a circle).

It should be recognized that the authentication-state available for transmission from a first active-member to a second active-member of an active-collaborative-collection may have been obtained from a third device, where said third device is currently or at some time in the past had been an active-member in an active-collaborative-collection with said first device. This can be cascaded from one device to another, and so forth, as allowed by the available storage in the authentication-state containers. In addition, this mechanism of using authentication-state to affect device functionality may be extended to an arbitrary number of devices, an arbitrary amount of authentication-state (either current, a log collected over time, or both), and an arbitrary number of functions, as one of ordinary skill in the art will recognize.

In this way wireless devices, according to the present invention, use the authentication-state of active-member devices of an active-collaborative-collection to affect the function of one or more of the devices in the active-collaborative-collection.

CONCLUSION

Although the present invention has been described using particular illustrative embodiments, it will be understood that many variations in construction, arrangement and use are possible consistent with the teachings and within the scope of the invention. For example, interconnect and function-unit bit-widths, clock speeds, and the type of technology used may generally be varied in each component block of the invention. Also, unless specifically stated to the contrary, the value ranges specified, the maximum and minimum values used, or other particular specifications (such as the mechanism for wireless communication), are merely those of the illustrative or preferred embodiments, can be expected to track improvements and changes in implementation technology, and should not be construed as limitations of the invention. Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

Specific variations within the scope of the invention include, but are not limited to: the type and number of wireless devices, the method of wireless communication (local and wide area), and functionality provided by the wireless devices, associated security policies, authentication-state, and communication protocols.

All such variations in design comprise insubstantial changes over the teachings conveyed by the illustrative embodiments. The names given to interconnect and logic are illustrative, and should not be construed as limiting the invention. It is also understood that the invention has broad applicability to other wireless applications, and is not limited to the particular application or industry of the illustrated embodiments. The present invention is thus to be construed as including all possible modifications and variations encompassed within the scope of the appended claims.

What is claimed:

1. An enhanced wireless device for selective operation in a group of wireless devices, the enhanced wireless device comprising:

a wireless access mechanism;

storage enabled to hold data and code, the data comprising state information for the enhanced wireless device, the state information comprising mutually exclusive exchanged and non-exchanged authentication states with respect to at least one other wireless device of the group, the state information further comprising a record of when an effective signal strength of the wireless access mechanism is sufficient to enable information exchange between the enhanced wireless device and the at least one other wireless device and when the effective signal strength is insufficient to enable the information exchange, the code comprising routines to implement a wireless access communications protocol stack, selectively update the state information, and support dynamic selection between at least a first association-based function and a second association-based function, the dynamic selection being at least partially based on the record;

a processor enabled to selectively execute the routines, the processor coupled to the wireless access mechanism and the storage;

wherein the first association-based function is selected when the exchanged authentication state becomes true and the second association-based function is selected when the non-exchanged authentication state becomes true; and wherein based at least partially on the dynamic selection between the first and second association-based functions, locally initiated access to at least one protected local resource is at least selectively restricted.

2. The enhanced wireless device of claim 1, wherein the second association-based function is implemented as a dynamic modification of the first association-based function.

3. The enhanced wireless device of claim 1, wherein the first and second association-based functions are provided as resources to applications executed by the processor.

4. The enhanced wireless device of claim 1, wherein the protocol stack is implemented in firmware and comprises functions for security and authentication, in-contact detection, identification, and authentication-state exchange.

5. The enhanced wireless device of claim 1, wherein the first association-based function provides greater capabilities to a local user of the enhanced wireless device.

6. The enhanced wireless device of claim 1, wherein the first association-based function provides more privileges to a local user of the enhanced wireless device.

7. The enhanced wireless device of claim 1, wherein the wireless access mechanism is compatible with version 1.1 of the Bluetooth™ wireless standard, as promulgated by the Bluetooth™ SIG in February 2001.

8. The enhanced wireless device of claim 1, wherein the wireless access mechanism is compatible with the IEEE™ Std 802.11-1997, as promulgated by the IEEE™ in 1997.

9. A method of operating wireless devices, comprising:
providing a plurality of wireless devices;
within at least one of the wireless devices, recording when an effective signal strength of a wireless access mechanism is sufficient to enable information exchange between the at least one wireless device and at least one other of the wireless devices and recording when the effective signal strength is insufficient to enable the information exchange;
exchanging identification information between at least some of the wireless devices, the wireless devices exchanging identification information forming a collaborative-collection, each wireless device exchanging identification information being a member of the collaborative-collection;
at least a first member monitoring for exchanges of authentication-state with a second member;
making a dynamically modifiable association-based function resident on the first member available as a resource to code executing on the first member, based at least partially on the acts of recording;
when authentication-state is not exchanged between the first member and the second member, the association-based function providing a first set of behaviors;
when authentication-state is exchanged between the first member and the second member, the association-based function providing a second set of behaviors; and
based at least in part on the association-based function, at least the first member imposing at least some restrictions on locally initiated access to at least one protected local resource.

10. The method of claim 9, wherein the second set of behaviors provides greater capabilities to a local user of the first member.

11. The method of claim 9, wherein the second set of behaviors provides more privileges to a local user of the first member.

12. The method of claim 9, wherein the collaborative-collection is established via the wireless access mechanism, and the wireless access mechanism is compatible with version 1.1 of the Bluetooth™ wireless standard, as promulgated by the Bluetooth™ SIG in February 2001.

13. The method of claim 9, wherein the collaborative-collection is established via the wireless access mechanism, and the wireless access mechanism is compatible with the IEEE™ Std 802.11-1997, as promulgated by the IEEE™ in 1997.

14. An enhanced wireless device for selective operation in a group of wireless devices, the enhanced wireless device comprising:
a wireless access mechanism;
storage enabled to hold data and code,
the data comprising state information for the enhanced wireless device, the state information comprising at least some in-contact history and some not in-contact history of the enhanced wireless device with respect to the group, the in-contact history comprising a record of when an effective signal strength of the wireless access mechanism is sufficient to enable information exchange between the enhanced wireless device and at least one member of the group and the not in-contact history comprising a record of when the effective signal strength is insufficient to enable the information exchange,
the code comprising routines to implement a wireless access communications protocol stack, update the state information, and support dynamic modification of at least one association-based function;
a processor enabled to execute the routines, the processor coupled to the wireless access mechanism and the storage;
wherein the dynamic modification is based at least partially on the in-contact history and the not in-contact history; and
wherein based at least partially on the association-based function, locally initiated access to at least one protected local resource is at least selectively restricted.

15. The enhanced wireless device of claim 14, wherein the dynamic modification is based at least in part on detection that an arbitrary predetermined time interval has lapsed after the time of the last contact of the enhanced wireless device with the group, the time of the last contact being represented by information maintained in the in-contact history.

16. The enhanced wireless device of claim 14, wherein the association-based function is provided as a resource to applications executed by the processor.

17. The enhanced wireless device of claim 14, wherein the protocol stack is implemented in firmware and comprises functions for security and authentication, in-contact detection, identification, and authentication-state exchange.

18. The enhanced wireless device of claim 14, wherein the in-contact history is implemented via a dynamic association events log.

19. The enhanced wireless device of claim 14, wherein the association-based function provides a local user of the enhanced wireless device with relatively greater capabilities when the enhanced wireless device remains in-contact with at least some of the group and relatively less capabilities when the enhanced wireless device is not in-contact with at least some of the group.

20. The enhanced wireless device of claim 14, wherein the association-based function provides a local user of the enhanced wireless device with relatively greater privileges when the enhanced wireless device remains in-contact with at least some of the group and relatively less privileges when the enhanced wireless device is not in-contact with at least some of the group.

21. The enhanced wireless device of claim 14, wherein the wireless access mechanism is compatible with version 1.1 of the Bluetooth™ wireless standard, as promulgated by the Bluetooth™ SIG in February 2001.

22. The enhanced wireless device of claim 14, wherein the wireless access mechanism is compatible with the IEEE™ Std 802.11-1997, as promulgated by the IEEE™ in 1997.

23. An enhanced wireless device for selective operation in a group of wireless devices, the enhanced wireless device comprising:
- a wireless access mechanism;
- storage enabled to hold data and code,
  - the data comprising state information for the enhanced wireless device, the state information comprising at least some in-contact history and some not in-contact history of the enhanced wireless device with respect to the group, the in-contact history comprising a record of when an effective signal strength of the wireless access mechanism is sufficient to enable information exchange between the enhanced wireless device and at least one member of the group and the not in-contact history comprising a record of when the effective signal strength is insufficient to enable the information exchange,
  - the code comprising routines to implement a wireless access communications protocol stack, update the state information, and support dynamic selective availability of at least a first function;
- a processor enabled to execute the routines, the processor coupled to the wireless access mechanism and the storage; and
- wherein the selective availability of the first function is based at least partially on the in-contact history and the not in-contact history, and when available the first function is a resource available to applications executing on the processor; and wherein based at least partially on the first function, locally initiated access to at least one protected local resource is at least selectively restricted.

24. The enhanced wireless device of claim 23, wherein the first function becomes available when the enhanced wireless device becomes in-contact with at least some of the group and becomes unavailable when the enhanced wireless device becomes not in-contact with at least some of the group.

25. The enhanced wireless device of claim 24, wherein the availability of the first function provides a local user of the enhanced wireless device with relatively greater capabilities than when the first function is not available.

26. The enhanced wireless device of claim 24, wherein the availability of the first function provides a local user of the enhanced wireless device with relatively greater privileges than when the first function is not available.

27. The enhanced wireless device of claim 23, wherein the first function becomes unavailable when the enhanced wireless device becomes in-contact with at least some of the group and becomes available when the enhanced wireless device becomes not in-contact with at least some of the group.

28. The enhanced wireless device of claim 23, wherein the selective availability is based at least in part on detection that an arbitrary predetermined time interval has lapsed after the time of the last contact of the enhanced wireless device with the group, the time of the last contact being represented by information maintained in the in-contact history.

29. The enhanced wireless device of claim 23, wherein the protocol stack is implemented in firmware and comprises functions for security and authentication, in-contact detection, identification, and authentication-state exchange.

30. The enhanced wireless device of claim 23, wherein the in-contact history is implemented via a dynamic association events log.

31. The enhanced wireless device of claim 23, wherein the in-contact history comprises information representing a plurality of in-contact status-change events and at least implicit time-related information for each event.

32. A method of operating wireless devices, comprising:
- providing a plurality of wireless devices;
- exchanging identification information between at least some of the wireless devices, the wireless devices exchanging identification information forming a collaborative-collection, each wireless device exchanging identification information being a member of the collaborative-collection;
- at least a first member maintaining state information comprising at least some in-contact history and some not in-contact history of the first member with respect to the plurality of wireless devices, the in-contact history comprising a record of when an effective signal strength of a wireless access mechanism is sufficient to enable information exchange between the first member and at least one other of the plurality of wireless devices and the not in-contact history comprising a record of when the effective signal strength is insufficient to enable the information exchange;
- at least the first member making an association-based function with dynamic behavior available to applications executing on the first member, the association-based function providing a first set of behaviors when a predetermined condition is met and providing a second set of behaviors when the predetermined condition is not met;
- based at least in part on the association-based function, at least the first member imposing at least some restrictions on locally initiated access to at least one protected local resource; and
- basing the predetermined condition at least in part on the in-contact history and the not in-contact history.

33. The method of claim 32, wherein the predetermined condition is based at least in part on whether the first member has been in-contact with a second member for a first threshold of time.

34. The method of claim 32, further comprising:
- the first member monitoring for exchanges of authentication-state with a second member; and
- wherein the predetermined condition is also based in part on whether authentication-state is currently exchanged between the first and second members.

35. The method of claim 34, wherein the association-based function provides greater capabilities to a local user of the first member when the first and second members are in-contact and authentication-state is currently exchanged between the first and second members.

36. The method of claim 34, wherein the association-based function provides more privileges to a local user of the first member when the first and second members are in-contact and authentication-state is currently exchanged between the first and second members.

37. The method of claim 32, wherein the collaborative-collection is established via the wireless access mechanism, and the wireless access mechanism is compatible with version 1.1 of the Bluetooth™ wireless standard, as promulgated by the Bluetooth™ SIG in February 2001.

38. The method of claim 32, wherein the collaborative-collection is established via the wireless access mechanism, and the wireless access mechanism is compatible with the IEEE™ Std 802.11-1997, as promulgated by the IEEE™ in 1997.

39. An enhanced wireless device for selective operation in a group of wireless devices, the enhanced wireless device comprising:

a wireless access mechanism;

storage for holding data and code, the data comprising state information for the enhanced wireless device, the state information comprising a log representing at least some in-contact history and some not in-contact history of the enhanced wireless device with respect to the group, the state information further comprising mutually exclusive exchanged and non-exchanged authentication-states with respect to at least one other wireless device of the group, the code comprising routines to implement a wireless access communications protocol stack, selectively update the state information, and support dynamic modification of at least a first function;

a processor for selectively executing the routines, the processor coupled to the wireless access mechanism and the storage; and wherein the dynamic modification is based at least partially on the in-contact history and the not in-contact history in the log in combination with the exchanged authentication-state; and wherein based at least partially on the first function, locally initiated access to at least one protected local resource is at least selectively restricted.

40. The enhanced wireless device of claim 39, wherein the first function is provided as a resource to applications executed by the processor.

41. The enhanced wireless device of claim 39, wherein the protocol stack is implemented in firmware and comprises functions for security and authentication, in-contact detection, identification, and authentication-state exchange.

42. The enhanced wireless device of claim 39, wherein the in-contact history is implemented via a dynamic association events log.

43. The enhanced wireless device of claim 39, wherein the first function provides a local user of the enhanced wireless device with relatively greater capabilities when the enhanced wireless device remains in-contact and has exchanged authentication-state with the at least one other device of the group and relatively less capabilities otherwise.

44. The enhanced wireless device of claim 39, wherein the first function provides a local user of the enhanced wireless device with relatively greater privileges when the enhanced wireless device remains in-contact and has exchanged authentication-state with the at least one other device of the group and relatively less privileges otherwise.

45. The enhanced wireless device of claim 39, wherein the log representing at least some in-contact history comprises information representing a plurality of in-contact status-change events and at least implicit time-related information for each event.

\* \* \* \* \*